US011612009B2

(12) United States Patent
Mukherjee et al.

(10) Patent No.: US 11,612,009 B2
(45) Date of Patent: Mar. 21, 2023

(54) APPARATUS AND METHODS FOR OPERATING MULTI-LINK DEVICES IN WIRELESS NETWORKS

(71) Applicant: Charter Communications Operating, LLC, St. Louis, MO (US)

(72) Inventors: Amitav Mukherjee, St. Louis, MO (US); Ahmad Reza Hedayat, St. Louis, MO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 161 days.

(21) Appl. No.: 16/945,563

(22) Filed: Jul. 31, 2020

(65) Prior Publication Data
US 2022/0039180 A1    Feb. 3, 2022

(51) Int. Cl.
*H04W 76/15*    (2018.01)
*H04W 24/08*    (2009.01)
(Continued)

(52) U.S. Cl.
CPC .......... *H04W 76/15* (2018.02); *H04B 7/0413* (2013.01); *H04W 24/08* (2013.01); *H04W 84/12* (2013.01); *H04W 88/08* (2013.01)

(58) Field of Classification Search
CPC ..... H04W 76/15; H04W 24/08; H04W 84/12; H04W 88/08; H04B 7/0413
See application file for complete search history.

(56) References Cited

U.S. PATENT DOCUMENTS 7,366,286 B1    4/2008  Shenoi
7,606,529 B1    10/2009 Swan et al.
(Continued)

FOREIGN PATENT DOCUMENTS

WO    WO-2015111767 A1 *   7/2015   .......... H04B 7/0413
WO    WO-2020197452 A1 *  10/2020   .......... H04B 17/345
(Continued)

OTHER PUBLICATIONS

IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification".
(Continued)

*Primary Examiner* — Peter P Chau
(74) *Attorney, Agent, or Firm* — Patent Beach PC

(57) ABSTRACT

Apparatus and methods for operating multiple link premises devices in a wireless network. In one embodiment, premises devices such as a wireless gateway, Access Point (AP) or user devices use Wireless Local Area Network (WLAN) technology for the transmission of data on multiple links operating on different frequencies. The disclosed apparatus and methods provide a solution to share channel statistic or similar data across the different links, such as for link performance improvement via more optimal MIMO operation. In one implementation, large-scale channel statistics are shared via the pre-amble or mid-amble of a frame across multiple links between an AP and a user device to enhance receiver performance. In another embodiment, the channel statistics are shared between multiple AP devices which can coordinate with each other, and/or are made specific to individual client devices, in order to enhance receiver performance.

19 Claims, 18 Drawing Sheets

(51) Int. Cl.
*H04B 7/0413* (2017.01)
*H04W 88/08* (2009.01)
*H04W 84/12* (2009.01)

(56) References Cited

U.S. PATENT DOCUMENTS

| | | |
|---|---|---|
| 10,693,687 B1 | 6/2020 | Kushnir |
| 2004/0158649 A1 | 8/2004 | Ophir et al. |
| 2004/0187156 A1 | 9/2004 | Palm et al. |
| 2005/0034159 A1 | 2/2005 | Ophir et al. |
| 2009/0110088 A1 | 4/2009 | Di Giandomenico et al. |
| 2009/0119735 A1 | 5/2009 | Dounaevski et al. |
| 2010/0064330 A1 | 3/2010 | Yu et al. |
| 2012/0083207 A1 | 4/2012 | Rofougaran et al. |
| 2015/0181363 A1 | 6/2015 | Khorami |
| 2016/0127434 A1 | 5/2016 | Yoon et al. |
| 2017/0118527 A1 | 4/2017 | Wachob et al. |
| 2017/0164068 A1 | 6/2017 | Wachob et al. |
| 2018/0167128 A1 | 6/2018 | Kinamon et al. |
| 2018/0242327 A1* | 8/2018 | Frenne ............... H04L 5/0062 |
| 2018/0269974 A1 | 9/2018 | Luciano |
| 2019/0028141 A1 | 1/2019 | Padden et al. |
| 2019/0334599 A1* | 10/2019 | Davydov ............ H04L 5/0051 |
| 2020/0112888 A1 | 4/2020 | Glennon et al. |
| 2020/0119877 A1* | 4/2020 | Wang .................. H04L 5/0005 |
| 2021/0028915 A1 | 1/2021 | Jia et al. |
| 2021/0112551 A1 | 4/2021 | Anderson et al. |
| 2021/0175925 A1 | 6/2021 | Tarighat Mehrabani |
| 2021/0250196 A1 | 8/2021 | Das et al. |
| 2021/0336815 A1 | 10/2021 | Das et al. |
| 2021/0337543 A1 | 10/2021 | Das et al. |
| 2021/0378039 A1* | 12/2021 | Cherian ............... H04W 76/15 |
| 2021/0409979 A1* | 12/2021 | Wang ................ H04W 52/0216 |
| 2022/0078624 A1 | 3/2022 | Hong |
| 2022/0132524 A1 | 4/2022 | Mueck et al. |

FOREIGN PATENT DOCUMENTS

| | | |
|---|---|---|
| WO | WO-2020232461 A2 * | 11/2020 |
| WO | WO-2021220624 A1 * | 11/2021 |

OTHER PUBLICATIONS

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018.

* cited by examiner

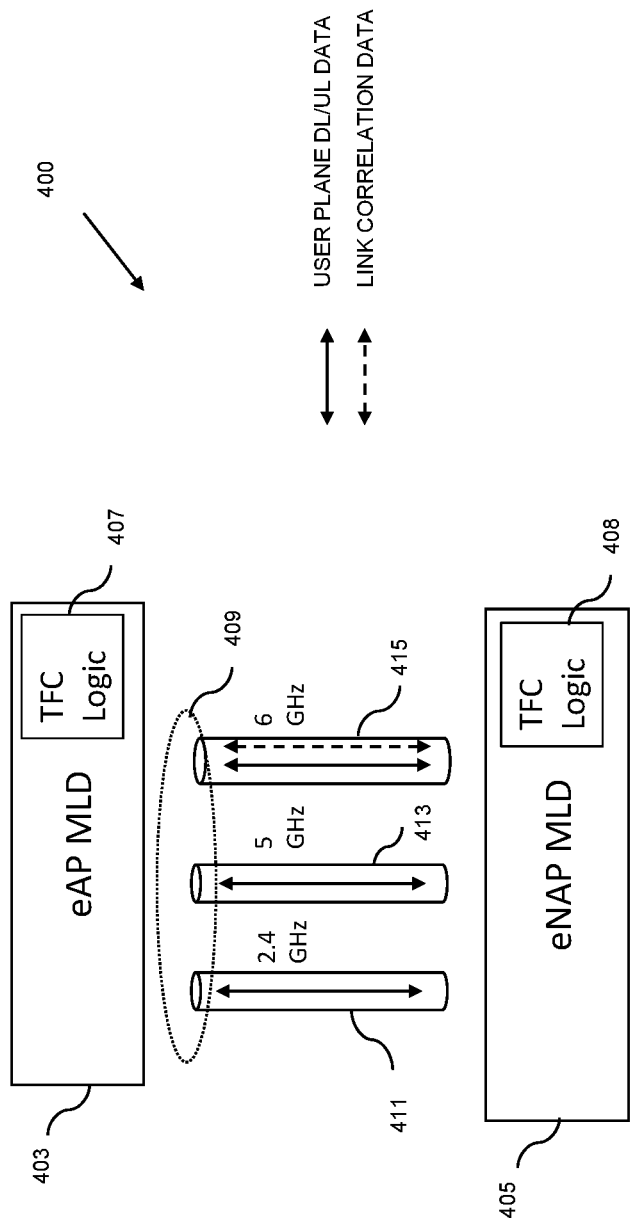

APPARATUS AND METHODS FOR OPERATING MULTI-LINK DEVICES IN WIRELESS NETWORKS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of computerized devices and networks thereof, and specifically in one exemplary embodiment, to methods and apparatus which allow a multi-link device to share wireless channel-related data across different links and even different devices.

2. Description of Related Technology

Data communication services are now ubiquitous throughout user premises (e.g., home, office, and even vehicles). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly adopting the paradigm of "anywhere", anytime," so that users (subscribers) can access the desired services (e.g., watch a movie) via a number of different receiving and rendering platforms, such as in different rooms of their house, on their mobile device while traveling, etc.

One primary facilitating technology for content and data distribution is wireless LAN (WLAN), such as the well-known Wi-Fi technology standardized under IEEE Std. 802.11 and all its variants and incarnations.

Wi-Fi® Technology (802.11)

Wireless networking technologies enable wireless devices to connect to one another. One ubiquitous application for wireless technology is to provide network access to client devices, such as laptops, smartphones, and other wireless-enabled user devices. One such technology that enables a user to engage in wireless communication (e.g., via services provided through the cable network) is Wi-Fi® (IEEE Std. 802.11), which has become the de facto standard for wireless networking in consumer electronics. Wi-Fi enables convenient access to networks (e.g., the Internet, intranets, other interconnected devices) via at least one access point ("AP," also colloquially referred to as "hotspots") to client devices within the AP's coverage area.

IEEE Std. 802.11 is part of the IEEE 802 set of LAN protocols, and specifies the set of media access control and physical layer protocols for implementing Wireless Local Area Network (WLAN), including transmitting communication signals in various frequencies such as 2.4 GHz, 5 GHz, 6 GHz, and 60 GHz frequency bands.

Commercially, Wi-Fi provides high-value services to users within their premises, within establishments, as well as venues outside of home, including houses, apartments, offices, cafes, hotels, business centers, restaurants, etc. A typical home setup may include a client device in wireless communication with an AP and/or modem (e.g., cable modem or CM) that are in communication with the backhaul portion of a service provider network. Although the AP and the CM are either stand alone or integrated into one "box," they are often physical and logically as if they were two different entities with no awareness of each other's status.

Today, Wi-Fi has become the standard choice for providing convenient means of Internet or other network access. Much of one's work-related activities (e.g., editing documents, reading emails), means of communication (e.g., instant messaging, social networking, sharing media) and means of entertainment (e.g., videos, music, books) may be performed or enabled with remote servers that are accessible via the Internet and/or the service provider's infrastructure. For example, myriad services are available to, e.g., stream content, collaborate with remote personnel, and store files online. As a result, consumers of all demographics are becoming less dependent on local content storage and less dependent on location. Rather, most information or content desired by consumers is stored and retrieved via the Internet or other network storage (i.e., from the "cloud"), which advantageously enables client devices to be used "on the go" and placed generally within the premises as long as an AP is nearby. Consequently, consumers depend on reliable network connectivity and expect, ideally, 100% "uptime," whether they are using mobile devices or personal computers.

Referring to FIG. 1, a premises network architecture serviced by a service provider such as an MSO is shown. In this architecture 100, a premises 101a-n is served by an MSO distribution network 117 (such as e.g., a hybrid fiber coax or fiber or satellite network). Within the premises 101a-n are cable modem (CM) 119a-n, router 121a-n, wireless access node 123a-n (e.g., Wi-Fi AP, which may integrate the router 121), and a number of served user devices such as a computerized device 125a-n (e.g., a DSTB or Smart TV), and a user end client device 125 (e.g., smartphone or tablet, mobile device). The headend 113 provides content sources 109 and data/application sources 111, as well as access to the broader Internet 115 and other external networks 105, such as via an MSO backbone.

Multi-Link Devices in 802.11be—

The 802.11ax standard, also referred to as "High Efficiency (HE)," builds on the legacy 802.11a frame format (See FIG. 2A), and introduced new mechanisms to serve more users in a consistent and reliable fashion, including for wireless link optimization and utilization.

IEEE is currently standardizing the 802.11be standard as the next-generation WLAN standard for Extremely High Throughput (EHT). 802.11be focuses on WLAN indoor and outdoor operation with stationary and pedestrian speeds in the 2.4, 5, and 6 GHz frequency bands. The 802.11be specification is built on the existing 802.11ax specification referenced above.

802.11 frames include a legacy PHY header or preamble (originated with 802.11a). As shown in FIG. 2A, within this header, a legacy "training" field (L-STF) and long training field (L-LTF) are used to perform time/frequency synchronization primarily on a 20 MHz channel. Note that during the detection of L-STF/L-LTF, the receiver does not have any information if the ongoing frame is 20 MH or has wider bandwidth.

802.11ax frames have additional training fields, such as HE-STF and HE-LTF. HE-STF allows receiver to synchronize to the timing and frequency of the incoming frame before decoding the packet. The HE-LTF field is used as a reference signal for channel estimation, enabling beamforming and MIMO spatial diversity. As shown in FIG. 2B, HE-LTF may be repeated in the middle of a frame, aka mid-amble, such as to enhance detection reliability during non-negligible Doppler conditions.

One of the salient features of 802.11be is the support for Multi-Link Device (MLD). FIG. 3 shows and exemplary prior art MLD device 300 that is configured for concurrent transmission and reception between a multi-band AP 303 and non-AP MLD device 305 such as a Station (STA) device on links operating on 2.4 GHz, 5 GHz, and 6 GHz frequency bands. Downlink (DL) and Uplink (UL) frames can be transmitted and received simultaneously over the links. For example, an STA client device 305 belonging to an MLD performs independent channel access over its links with the AP MLD 303 to transmit and receive data frames.

MLD advantages include improved traffic throughput, the availability of load balancing across frequency bands, concurrent transmission and reception for peak throughput, and reduced MAC overhead due to one-step multi-link negotiation and setup.

Quasi Colocation in 3GPP Network

NG-RAN or "NextGen RAN (Radio Area Network)" is part of the 3GPP "5G" next generation radio system. 3GPP is currently specifying Release 17 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

The LTE and NR currently support the so-called Quasi Colocation (QCL) concept, which uses statistical correlations of the channel across antenna ports of reference signals. QCL is crucial for efficient Multiple-Input-Multiple-Output (MIMO) receiver signal processing and channel estimation.

In 3GPP specifications, QCL is implemented such that if two antenna ports are quasi co-located, the UE may assume that "large-scale" properties of the signal received from the first antenna port can be inferred from the signal received from the other antenna port. The large-scale properties referenced above consist of some or all of, delay spread, Doppler spread, frequency shift, average received power, and/or received timing. As specified in the 3GPP specifications, RRC configuration is supported in two different scenarios: i) Type A QCL, wherein all antenna ports are QCL; and ii) Type B QCL, which indicates CSI-RS (channel state information reference signal) with PDSCH DMRS (physical downlink shared channel demodulation reference signal).

3GPP 5G NR supports configuration of four types of QCL among antenna ports of different reference signals:

i) QCL-Type A: {Doppler shift, Doppler spread, average delay, delay spread}
ii) QCL-Type B; {Doppler shift, Doppler spread}
iii) QCL-Type C: {Doppler shift, average delay}
iv) QCL-Type D: {Spatial Rx parameter}

The different QCL types shown above reflect different scenarios. For instance, in some scenarios DL transmissions on two Component Carriers (CCs) with different Doppler shifts and delay parameters may share the same analog beam; hence, they are QCL with Type D. In some other scenarios, where two DL transmissions on the same CC are not on the same beam but share the same RF chain, they are QCL with Type B. In another scenario, different antenna ports of the same DL RS resource (e.g., PDSCH DMRS) on a given CC can be assumed to be QCL Type A since they are received within the same set of RBs (resource blocks).

The 3GPP QCL concept described above improves the receiver decoding performance by using the statistical correlation of the channel between the transmitter and receiver as between different links. For instance, as widely discussed in the literature, MIMO channel estimation methods require knowledge of the second-order statistics of the vector channel between transmitter and receiver. In practice, these statistics are estimated from reference signals or training fields using a sample covariance matrix. It is noted that the accuracy of the estimation increases with increasing the number of samples.

Unaddressed Needs

However, in 802.11be MLD operation, a given link may have narrower bandwidth or intermittent transmission, and therefore independent channel estimation, and MIMO signal processing on each link which ignores any such statistical correlations between the different link can significantly degrade the efficiency and performance of the link. 802.11be has no existing mechanism for leveraging any such correlations which may exist.

Accordingly, improved methods and apparatus are needed to enable, inter alia, sharing of e.g., large-scale channel statistics among multiple links during MLD operation, such as for instance on multiple links between AP MLD and non-AP MLD devices, or between three or more MLD devices. Such improved methods and apparatus would ideally also improve receiver performance and throughput without requiring an increase in RF transmission power.

SUMMARY

The present disclosure addresses the foregoing needs by providing, inter alia, apparatus and methods for operating wireless devices having multi-link capability.

In a first aspect of the disclosure, a multi-link wireless access point apparatus is described. In one embodiment, the apparatus comprises: digital processor apparatus; at least one wireless transceiver chain in data communication with the digital processor apparatus and comprising at least one antenna element; and computer readable apparatus in data communication with the digital processor apparatus and comprising storage medium, the storage medium comprising at least one computer program comprising a plurality of instructions.

In one variant, the plurality of instructions are configured to, when executed on the digital processor apparatus, cause the multi-link wireless access point apparatus to utilize one or more channel statistics associated with a first wireless link for at least one second wireless link of the device so as to exploit at least one commonality between the first wireless link and the second wireless link.

In one implementation thereof, the exploitation of the at least one commonality between the first wireless link and the second wireless link comprises utilization of the one or more channel statistics to increase a quality of MIMO (multiple input, multiple output) channel estimation for at least the first and second wireless links.

In another implementation thereof, the exploitation of the at least one commonality between the first wireless link and the second wireless link comprises utilization of training correlation data based at least in part on data relating to the one or more channel statistics. For example, the utilization of training correlation data based at least in part on data relating to the one or more channel statistics comprises transmission from the multi-link wireless access point apparatus of the training correlation data to one or more receiver devices in wireless communication with the multi-link wireless access point apparatus, the transmitted training correlation data indicating a correlation between at least the first wireless link and the second wireless link.

In another example, the multi-link wireless access point apparatus comprises an Access Point (AP) compliant with at least one IEEE Std. 802.11 standard; the one or more receiver devices each comprise an STA (station) compliant with the at least one IEEE Std. 802.11 standard; and the transmitted training correlation data comprises data indicative of a plurality of parameters each relating to one or more physical characteristics of the first wireless link.

In yet another example, the transmitted training correlation data comprises data indicative of a plurality of parameters each relating to one or more physical characteristics of the first wireless link, the plurality of parameters selected from the group consisting of: (i) average delay, (ii) Doppler Shift, (iii) delay spread, (iv) Doppler spread, and (iv) beam direction.

In still a further example, the transmitted training correlation data comprises (i) first training correlation data transmitted on the first wireless link, and (ii) second training correlation data transmitted on the second wireless link. In one configuration thereof, the multi-link wireless access point apparatus is further configured to create a third wireless link; the transmitted training correlation data further comprises third training correlation data transmitted on the third wireless link; the first training correlation data includes at least data indicating whether a correlation or applicability for each of a plurality of parameters exists between the first wireless link and at least one of the second wireless link or the third wireless link; the second training correlation data includes at least data indicating whether a correlation or applicability for each of the plurality of parameters exists between the second wireless link and at least one of the first wireless link or the third wireless link; and the third training correlation data includes at least data indicating whether a correlation or applicability for each of a plurality of parameters exists between the third wireless link and at least one of the second wireless link and first wireless link.

In yet another example, the multi-link wireless access point apparatus comprises an Access Point (AP) compliant with at least one of IEEE Std. 802.11ax or IEEE Std. 802.11be; the first training correlation data transmitted on the first wireless link is transmitted using at least a portion of an existing preamble or mid-amble training data field transmitted on the first wireless link; and the second training correlation data transmitted on the second wireless link is transmitted using at least a portion of an existing preamble or mid-amble training data field transmitted on the second wireless link.

In still another example, the one or more receiver devices in wireless communication with the multi-link wireless access point apparatus comprise a plurality of receiver devices; and at least one of the first training correlation data or second training data is applicable to only a particular one of the plurality of receiver devices.

In another variant of the apparatus, the at least one wireless transceiver chain comprises at least first and second wireless transceiver chains each enabled for establishment of a plurality of wireless links with respective first and second wireless receiver devices; and the plurality of instructions are further configured to, when executed on the digital processor apparatus, cause the multi-link wireless access point apparatus to utilize one or more channel statistics associated with the plurality of wireless links associated with the first transceiver chain for at least one of the plurality of wireless links associated with the second transceiver chain.

In another aspect of the disclosure, a method of operating a multi-link access point within a wireless network is disclosed. In one embodiment, the method includes simultaneously transacting data frames between the multi-link access point and at least one user device via a plurality of wireless links, each of the plurality of wireless links assigned to a different frequency band; measuring at least one parameter relating to channel quality in each of the plurality of wireless links; determining at least one channel quality statistic based at least on the measuring; and utilizing the determined at least one channel quality statistic across two or more of the plurality of wireless links so as to improve at least one aspect of wireless link performance.

In one variant of the method, the at least one user device comprises a plurality of user devices, and the utilizing the determined at least one channel quality statistic across two or more of the plurality of wireless links comprises utilizing the determined at least one channel quality statistic only across selected ones of the plurality of user devices.

In another variant, the at least one user device comprises a plurality of user devices, and the utilizing the determined at least one channel quality statistic across two or more of the plurality of wireless links comprises utilizing the determined at least one channel quality statistic only across selected ones of the plurality of wireless links.

In a further variant the measuring at least one parameter relating to channel quality in each of the plurality of wireless links comprises measuring at least one parameter selected from the group consisting of: (i) average delay, (ii) Doppler Shift, (iii) delay spread, (iv) Doppler spread, and (iv) beam direction.

In still another variant, the determining at least one channel quality statistic comprises determining at least one large-scale channel statistic; and the utilizing the determined at least one channel quality statistic across two or more of the plurality of wireless links so as to improve at least one aspect of wireless link performance comprises using the at least one large-scale channel statistic across at least three (3) different wireless links of the same receiver so as to improve at least MIMO (multiple input multiple output) channel estimation for at least one of the three links.

In another aspect, a computerized wireless device configured for wireless communication with a wireless network access point within a wireless infrastructure is disclosed. In one embodiment, the computerized wireless device includes: digital processing apparatus; at least one wireless network interface in data communication with the digital processing apparatus; and a storage device in data communication with the digital processing apparatus, the storage device comprising a storage medium having at least one computer program.

In one variant, the at least one computer program is configured to, when executed on the digital processing apparatus, cause the computerized wireless device to: establish a plurality of wireless links with the wireless access point, the plurality of wireless links each utilizing a frequency band different than one or more others of the plurality of wireless links; receive a plurality of training data via at least a portion of the plurality of wireless links, the training data comprising data based on large-scale channel statistical data; and utilize the received plurality of training data as part of at least one of a channel estimation process performed by the computerized wireless device.

In one implementation thereof, the at least one wireless network interface is compliant with an IEEE 802.11 standard supporting multiple wireless links; and the establishment of a plurality of wireless links with the wireless access point, the plurality of wireless links each utilizing a frequency band different than one or more others of the plurality of wireless links, comprises establishment of at least one link within at least each of: (i) a 2.4 GHz frequency band; and (ii) a 5 GHz frequency band or a 6 GHz frequency band. In one configuration, the IEEE 802.11 standard supporting multiple wireless links comprises an IEEE Std. 802.11be Standard; and the reception of the plurality of training data via at least a portion of the plurality of wireless links comprises reception of link correlation data via at least one preamble or midamble of a single user (SU) frame, the link correlation data valid across each of the frequency bands.

In another configuration, the IEEE 802.11 standard supporting multiple wireless links comprises an IEEE Std. 802.11be Standard; and the reception of the plurality of training data via at least a portion of the plurality of wireless links comprises reception of link correlation data via at least one preamble or midamble of a multiple user (MU) frame, the link correlation data valid across only across s subset of the frequency bands.

In yet another configuration, the IEEE 802.11 standard supporting multiple wireless links comprises an IEEE Std. 802.11be Standard; and the reception of the plurality of training data via at least a portion of the plurality of wireless links comprises reception of link correlation data via at least one preamble or midamble of a multiple user (MU) frame, the link correlation data valid across only across s subset of the frequency bands.

In another aspect, a method for operating a multi-link access point in a WLAN is described. In one embodiment, the method includes: simultaneously transmitting data frames from the access point to a client user device via multiple wireless links, wherein each link is assigned to a different frequency band; measuring the channel quality in each of the links; determining the large-scale channel statistics based on the measured channel; and sharing the large-scale channel statistics or correlation data based thereon on one or more links.

In one embodiment large-scale channel statistics are shared across different carrier frequencies on a pairwise basis. In another embodiment, the large-scale channel statistics are indicated across training fields of different links in the MLD operation.

In one variant, the large-scale channel statistics are indicated in a pre-amble of a frame. In another variant, the large-scale channel statistics are indicated alternatively or concurrently in a midamble of the frame.

In one implementation the large-scale channel statistics include one or more of average delay, Doppler shift, delay spread, Doppler spread, and/or beam direction.

In another embodiment, the large-scale channel statistics are indicated across DL and UL directions as well as across the different (frequency) links. In one implementation, the method includes: performing a sounding procedure to estimate channel statistics in one direction (UL/DL); utilizing channel statistics on the one direction to compute the beamforming/precoding weights on the other direction (DL/UL); and transmitting data on DL and/or UL using the computed weights.

In another aspect, a method for operating at least two multi-link access points in a WLAN is described. In one embodiment, the two or more access points coordinate with each other, and the method includes: simultaneously transmitting data frames from the access points to a common client user device via multiple wireless links, where each link is assigned to a different frequency band; measuring the channel quality in each of the links; determining the large-scale channel statistics based on the measured channel; sharing the large-scale channel statistics between the two or more access points; and based on the coordination between the access points, determining links for which to indicate the shared large-scaled channel statistics to the common client device.

In another aspect of disclosure, a Wi-Fi access point (AP) is disclosed. In one embodiment, the AP includes: a processor apparatus; a baseband processor in data communication with processor apparatus; a program memory in data communication with processor apparatus; one or more RF front end modules; a local database; and a network interface module in data communication with a backhaul network. In one implementation, the program memory includes at least one program which is configured to, when executed to the processor apparatus, causes transmission or reception of communication signals on multiple links within different frequency bands based at least on channel estimation using cross-channel correlation statistics.

In another aspect of disclosure, a user device is disclosed. In one embodiment, the user device is a Wi-Fi 802.11 complaint STA and includes: a processor apparatus; a baseband processor in data communication with processor apparatus; a program memory in data communication with processor apparatus; and one or more RF front end modules. The program memory includes at least one program which is configured to, when executed to the processor apparatus, causes transmission or reception of communication signals on multiple frequency bands with one or more MLD APs.

In an additional aspect of the disclosure, computer readable apparatus is described. In one embodiment, the apparatus includes a storage medium configured to store one or more computer programs, such as on a wireless access point of a managed wireless network. In one embodiment, the apparatus includes a program memory or HDD or SDD and stores one or more computer programs causing transmission or reception of communications signals over multiple frequency bands based at least on shared statistics.

In a further aspect, a method of utilizing channel statistics for a first wireless link of a multi-link device for at least one second wireless link of the device is disclosed. In one variant, the first link comprises a link which has a greater level of training data associated therewith than that of the at least one second link.

In another aspect of disclosure, an enhanced Multiple-Input-Multiple-Output (MIMO) transmission framework for use within a wireless network is disclosed.

In another implementation, a packet preamble or midamble protocol for use in communicating channel statistics is disclosed. In one embodiment, the protocol uses one or more TFC fields to communicate channel correlation pairs or tuplets indicating cross-channel statistical correlations within 802.11be devices.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device. In some variants, the foregoing IC includes logic implementing channel estimation (such as for MIMO enhancement) using shared large-scale channel statistics.

In another aspect, a wireless link frame configuration is disclosed. In one embodiment, the frame comprises a multi-user (MU) frame that is configured to include multiple TFC values for different users. In one implementation, the EHT-SIG-B field in MU frame is modified to include TFCs for different user devices.

In another implementation, the TFC are extended to be included in the midambles of MU frame.

In another embodiment, the TFC is defined across DL and UL directions as well as across links. In one implementation, the precoding/beamforming information in DL (or UL) is utilized to compute MIMO precoding/beamforming information in UL (or DL).

In another embodiment, TFC sharing concept is extended to multiple-AP coordination scenario. In one implementation, the TFC indication can be constructed on per-AP and per-link basis, where the TFC on one link can address the links on multiple APs.

In yet another aspect, methods and apparatus for using two or more links of an MLD having a common channel covariance matrix so as to provide better estimation accuracy rather than estimating individual channels separately, are disclosed.

In a further aspect, methods and apparatus for indicating statistical correlations across the training fields (TFs) of different links in MLD operation, in order to boost the quality of MIMO channel estimation and signal processing for all links, are disclosed.

In yet another aspect, methods and apparatus for coordinating training data across multiple wireless links are disclosed. In one embodiment, the methods and apparatus maintain one or more common attributes such as e.g., periodicity across the links for the data.

These and other aspects shall become apparent when considered in light of the disclosure provided herein.

BRIEF DESCRIPTION OF THE DRAWINGS

FIG. 4 is a functional block diagram illustrating a first exemplary embodiment of an enhanced MLD architecture according to the present disclosure.

FIGS. 1 and 3-14 ©Copyright 2020 Charter Communications Operating, LLC. All rights reserved.

DETAILED DESCRIPTION

Figure 1:
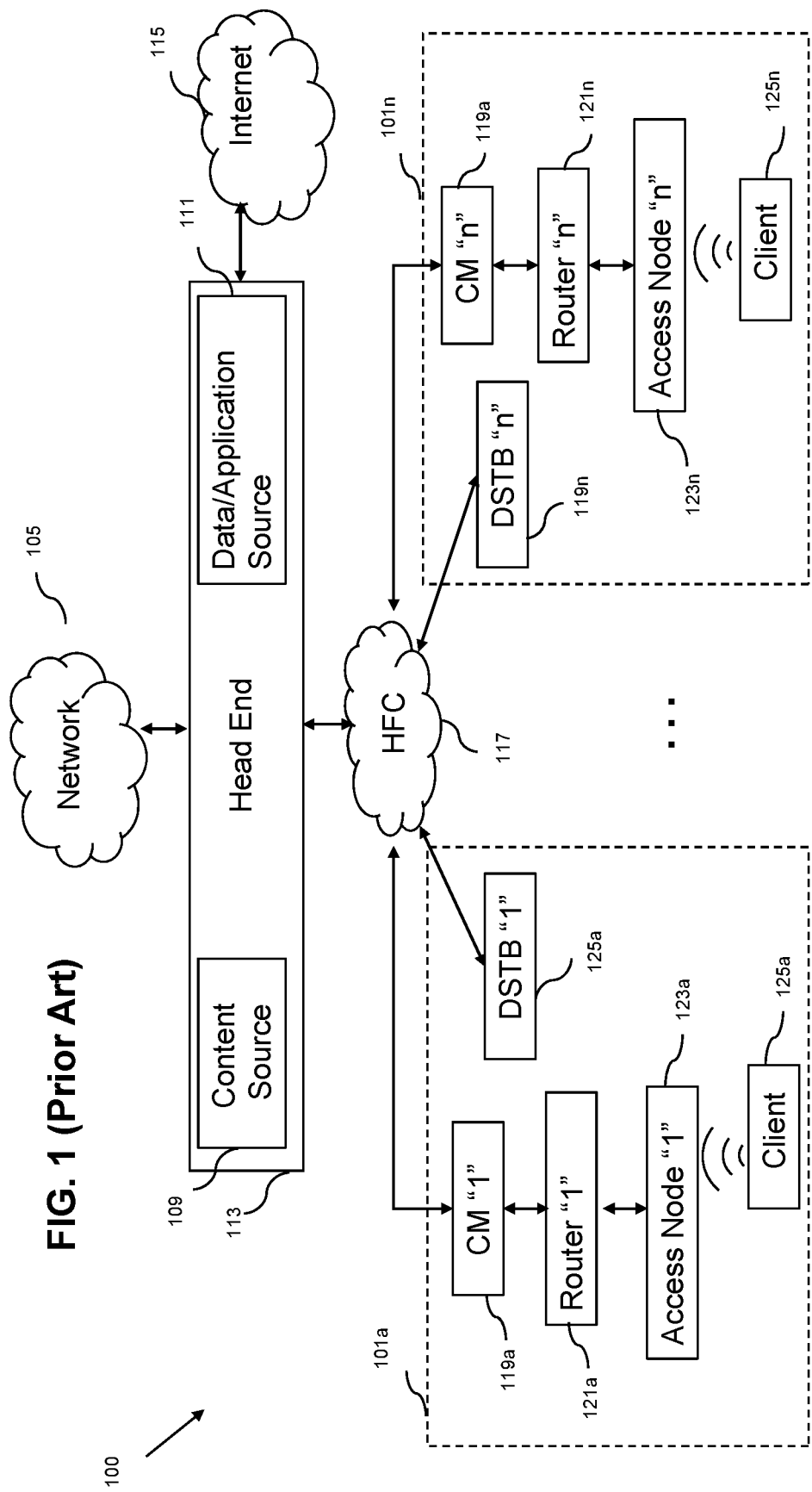
FIG. 1 is a functional block diagram illustrating a typical prior art premises service delivery configuration.
Figure 2A:
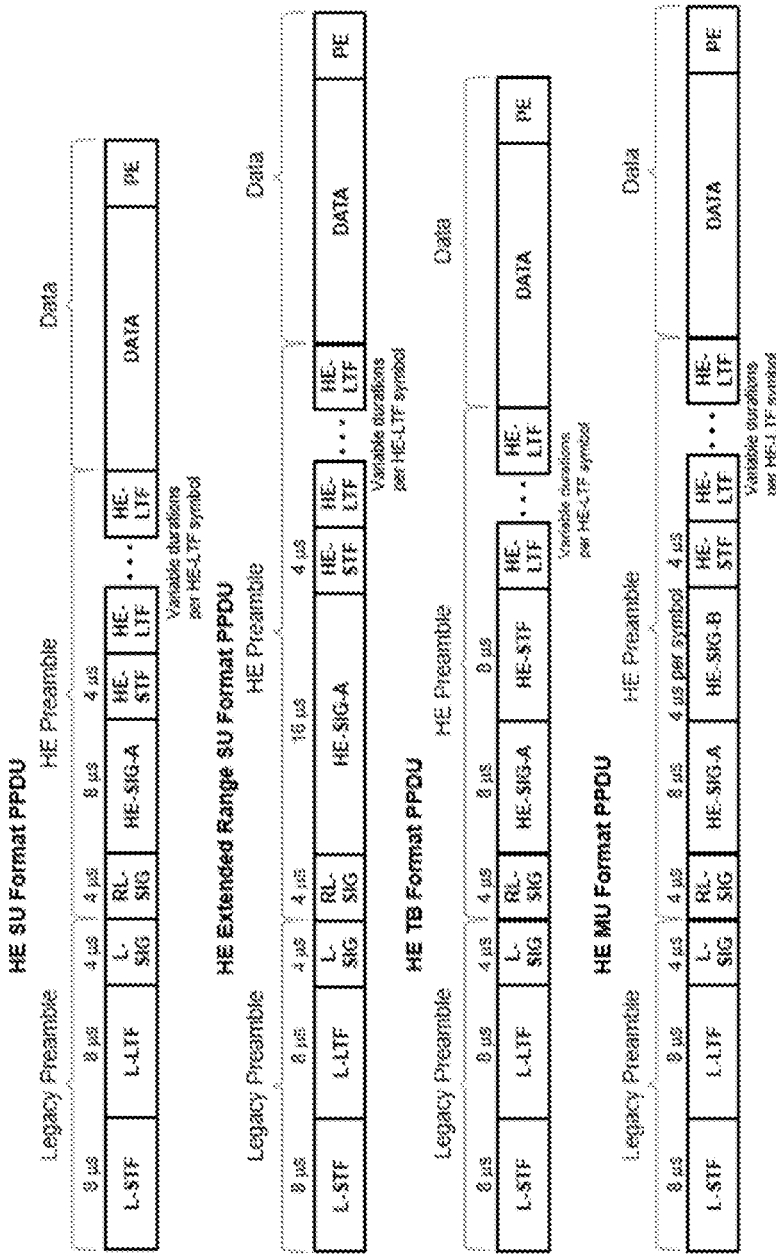
FIG. 2A is a functional block diagram illustrating prior art 802.11 SU (single user) and MU (multi-user) frames structures including the legacy preamble.
Figure 2B:
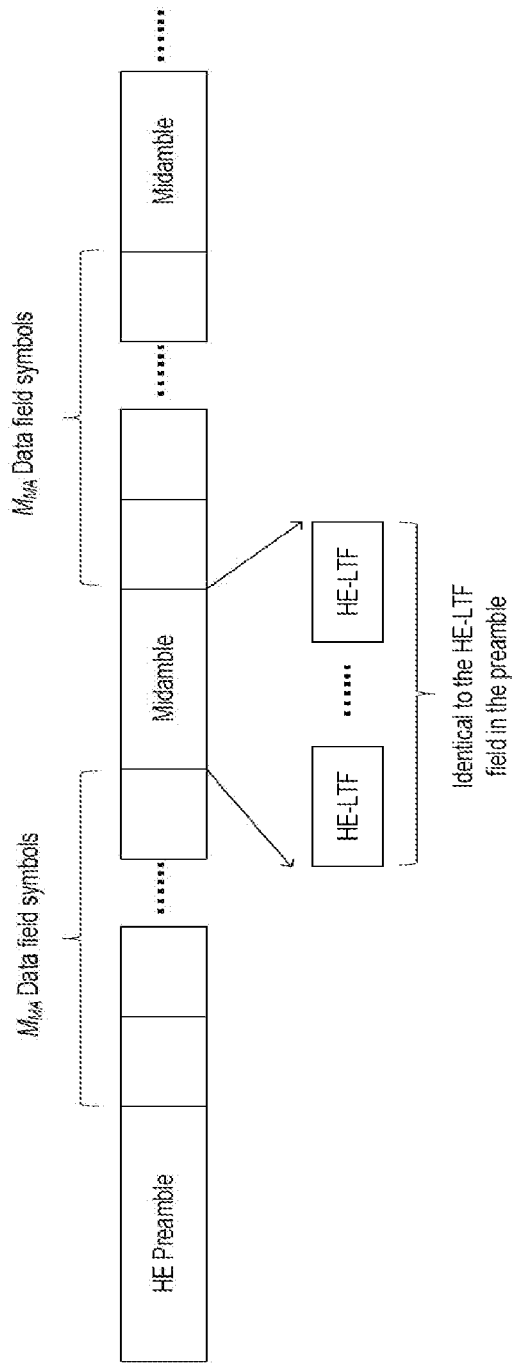
FIG. 2B is a functional block diagram illustrating prior art 802.11 frame structure including preamble and midamble.
Figure 3:
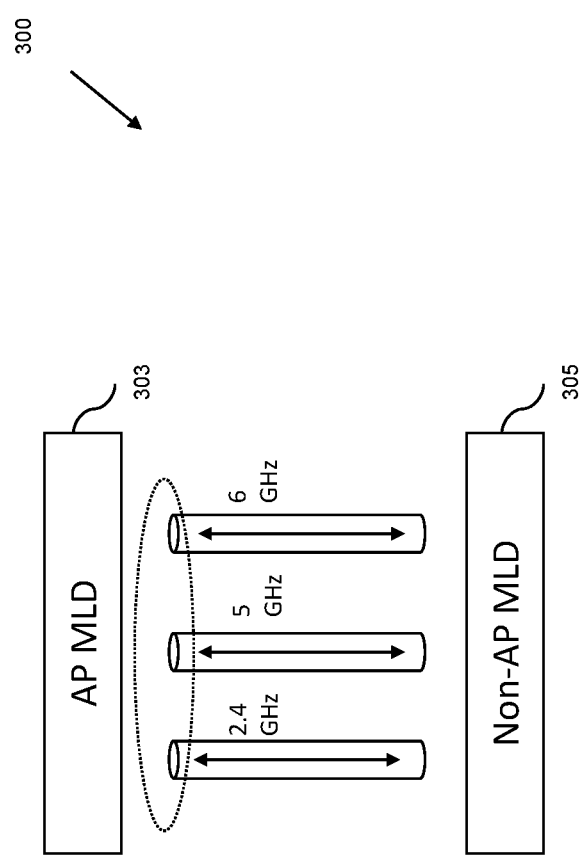
FIG. 3 is a functional block diagram illustrating a prior art 802.11 MLD (multi-link device) configuration.

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator, etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety, and any related documents or subsequent versions thereof.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, smart TVs, USB-based devices, and vehicle infotainment or navigation systems.

As used herein, the term "computer program" or "software" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM, PROM, EEPROM, DRAM, SDRAM, DDR/2/3/4/5/6 SDRAM, EDO/FPMS, RLDRAM, SRAM, "flash" memory (e.g., NAND/NOR), 3D memory such as XPoint, and PSRAM.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11, Wi-Fi Direct, etc.), LTE/LTE-A, 5G-NR, WiMAX (802.16), Zigbee®, Z-wave, PAN (e.g., 802.15), power line carrier (PLC), or IrDA families.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information, whether local, virtual, or cloud-based.

As used herein, the term "Wi-Fi" refers to, without limitation and as applicable, any of the variants of IEEE Std. 802.11 or related standards including 802.11 a/b/g/n/s/v/ac/ax/ay/ba/be, 802.11-2012/2013 or 802.11-2016, as well as Wi-Fi Direct (including inter alia, the "Wi-Fi Peer-to-Peer (P2P) Specification", each of the foregoing incorporated herein by reference in its entirety).

As used herein, the term "wireless" means any wireless signal, data, communication, or other interface including without limitation Wi-Fi, Bluetooth/BLE/Bluetooth Mesh Networking, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), CBRS (e.g., 3.55-3.70 GHz), 802.20, Zigbee®, Z-wave, NFC (near field communication), RFID, narrowband/FDMA, OFDM, PCS/DCS, LTE/LTE-A/LTE-U/LTE-LAA, 5G NR (including e.g., NR-U), analog cellular, CDPD, satellite systems, millimeter wave or microwave systems, acoustic, Li-Fi, and infrared (i.e., IrDA).

As used herein, the term "xNB" refers to any 3GPP-compliant node including without limitation eNBs (eUTRAN) and gNBs (5G NR).

Overview

In one exemplary aspect, the present disclosure provides improved methods and apparatus for operating multi-link devices within wireless networks such as WLANs. In particular, the present disclosure provides inter alia, mechanisms for enhancing the wireless connectivity between devices by sharing signal statistics across multiple wireless links of the device(s), such as for IEEE Std. 802.11 MLDs (multi-link devices).

In one embodiment, correlations between the different wireless links (e.g., the different links may share large scale channel statistics such as average delay, Doppler shift, statistical distribution, delay spread, etc.) are leveraged one or more of joint signal detection and/or channel estimation, including across links operating at significantly different frequencies. As such, a given link that may have narrower bandwidth or intermittent transmission, and therefore independent channel estimation and MIMO signal processing (such as that used in extant WLAN standards), can be enhanced through identification and utilization of the statistical correlations between the different links, thereby significantly increasing the efficiency and performance of the link over that of the link without such enhancement.

In one implementation, training data (e.g., Training Field Correlations or "TFC") are shared across multiple links between an enhanced MLD Access Point (eAP) and enhanced Non-AP MLD (eNAP). In one variant, the extant EHT-SIG field in the preamble of an 802.11 data frame is extended to include a set of TFC values indicative of statistics shared between different links. In one such configuration, the TFC data of one link indicates correlations (if any) between that link and all other links.

In another configuration, the TFC data is utilized on a pairwise basis between e.g., two links. In yet another variant, the TFC data is indicated during MLD setup (instead of in the EHT-SIG field).

The foregoing enhancements can be used in a variety of different operating scenarios or configurations, including for instance: (i) single eAP with multiple users (eNAPs); (ii) single eNAP connected to multiple eAPs; and (iii) DL and UL traffic transmitted over different links that have been statistically correlated.

Advantageously, only comparatively minor modifications to extant infrastructure and protocols are required to support the foregoing functionalities.

DETAILED DESCRIPTION OF EXEMPLARY EMBODIMENTS

Exemplary embodiments of the apparatus and methods of the present disclosure are now described in detail. While some of these exemplary embodiments are described in the context of a managed network (e.g., hybrid fiber coax (HFC) cable) architecture having a multiple systems operator (MSO), digital networking capability, IP delivery capability, and a plurality of client devices, the general principles and advantages of the disclosure may be extended to other types of networks and architectures that are configured to deliver services such as digital media data (e.g., text, video, and/or audio/voice), whether managed or unmanaged or ad hoc in nature. Such other networks or architectures may be broadband, narrowband, wired or wireless, or otherwise.

It will also be appreciated that while described generally in the context of a network providing service to a customer or consumer (e.g., residential) end user domain, the present disclosure may be readily adapted to other types of environments including, e.g., commercial/enterprise and government/military applications. Myriad other applications are possible.

Similarly, while described primarily in terms of Wi-Fi/IEEE Std. 802.11, the various aspects of the disclosure may be applied to other frequency bands and/or types of air interfaces and protocols, whether RF-based or otherwise.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Additionally, while cast primarily in terms of wireless embodiments (such as those under the IEEE Std. 802.11 family), the methods and apparatus described herein may be adapted to other multiband training environments, including e.g., wireline solutions such as e.g., those utilizing 802.11-based chipsets or technology as a basis for waveform generation, transmission and reception. See e.g., co-owned and co-pending U.S. patent application Ser. No. 16/788,138 entitled "APPARATUS AND METHODS FOR PROVIDING HIGH-CAPACITY DATA SERVICES OVER A CONTENT DELIVERY NETWORK," filed Feb. 11, 2020, which is incorporated herein by reference in its entirety.

Other features and advantages of the present disclosure will immediately be recognized by persons of ordinary skill in the art with reference to the attached drawings and detailed description of exemplary embodiments as given below.

Enhanced MLD (eMLD) Configurations—

Referring now to FIG. 4, an exemplary configuration 400 for shared correlation between multiple links of an enhanced AP MLD (e.g., eAP) and an enhanced non-AP MLD (e.g., eNAP such as an eSTA or eUE) in the context of an 802.11 Wireless Local Area Network (WLAN) is shown and described.

As shown, the architecture 400 generally utilizes the eAP MLD 403, an eNAP device 405, and multiple wireless links for transmission of data over different frequencies 411, 413, 415 as shown (2.5 GHz, 5 GHz, 6 GHz). DL and UL frames can be transmitted and received simultaneously over each of the individual links of the group 409. Each eNAP device 409 belonging to or associated with the eAP 403 performs independent channel access over the links to transmit or receive data. The MLD configuration 400 improves traffic load balancing across frequency bands, concurrent transmission and reception for peak throughput, and reduced MAC overhead due to one-step multi-link negotiations and setup.

Included within both the eAP 403 and eNAP are TFC logic 407, 408 which is configured to manage sharing training data values on the group of links 409. The configuration of the eAP logic 407 is somewhat different than that of the eNAP, due to the asymmetries involved in channel estimation and MIMO configuration, as well as transmission and utilization of training data (e.g., the training field correlation or TFC data as described in greater detail below). As used in the present context, the term "training data" refers without limitation to statistical or other data used for correlation of one or more parameters or properties, with the TFC data being merely one exemplary species thereof.

As a brief aside, as specified in IEEE 802.11 specifications, the beamforming weights are computed via a sounding protocol. In the sounding protocol, an AP sends Null Data Packets (NDP) to the STA(s). The NDP packets are sent to determine a channel matrix between the AP and the recipient STA. Once the STA receives the NDP packets, it estimates the channel parameters, and feeds back to the AP the estimated channel matrix. The AP then computes the precoding/beamforming weights based on the estimated channel feedback from the STA.

As such, the foregoing procedure is leveraged in the exemplary architecture of FIG. 4; i.e., by understanding that two or more links (and their wireless physical channels) are correlated based on e.g., large-scale statistics, the formed channel matrix is significantly more accurate as compared to the "silo" approach of independent estimation.

It will be appreciated that while FIG. 4 illustrates the transmission of training/correlation data via a single one of the multiple (i.e., three) links between the eAP and eNAP for simplicity of illustration, such data may be transmitted over multiple of the links, including simultaneously, as described in greater detail subsequently herein.

Figure 5A:
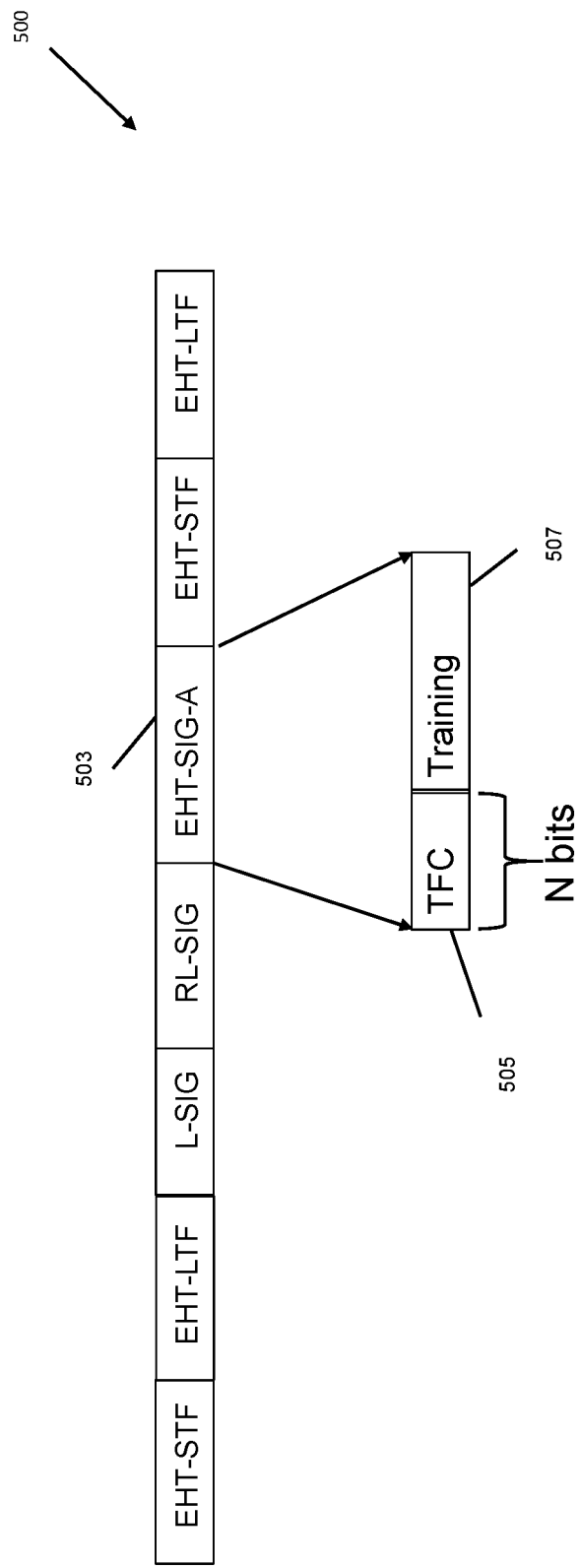
FIG. 5A is a graphical representation of an exemplary 802.11be SU frame structure according to one embodiment of the present disclosure.

FIG. 5A shows an exemplary data frame (e.g., an 802.11be frame) 500 used in one embodiment of the present disclosure for carriage of the aforementioned training data (including legacy PHY header, not shown). In this frame, the TFC data 505 (here, N bits such as N=5) is included along with other training data 507 within an EHT-SIG-A (signal) field 503. As a brief aside, and depending on use case/scenario, the frame 500 may be configured as a single user (SU) frame, a multiple user (MU) frame, or a trigger based (TB) frame, as now described in greater detail.

In the exemplary EHT SU frame (FIG. 5A), data carried across the available frequency bandwidth is processed as a whole by a single receiver (e.g., eNAP). All the information required for processing is carried within the EHT-SIG-A field. A variation of this format may be used for coverage of extended use cases.

In the EHT MU frame, only data carried across a portion of the available bandwidth is processed by a single receiver (e.g., eNAP). A recipient obtains information for processing the frame from the EHT-SIG-A and EHT-SIG-B fields, where the latter (the "user specific" field) carries specific information for processing the payload for each portion of the bandwidth.

In the EHT Trigger-based (TB) frame, the data carried in a portion of the bandwidth is generated by a single transmitter, and hence multiple transmitters can be used to create the data across the entirety of the bandwidth.

Hence, in the SU case of FIG. 5A, the EHT-SIG-A 503 includes a N-bit length TFC field used for communication of large-scale link statistical correlations, and the training field 507 is used for channel estimation and synchronization. The data of the TFC field 505 which indicates e.g., average delay, Doppler shift, statistical distribution, delay spread, etc., can be used to improve channel estimation accuracy and decoding performance, as compared to prior art solutions where channel estimation and other processes are performed effectively in isolation of one another.

As noted elsewhere herein, the TFC field 505 may be transmitted within one link, and shared between the other links.

One salient relationship between the links can further be leveraged using the techniques described herein; specifically, the ability of links to "train" at a faster rate and/or more accurately than those performing channel estimation in isolation. Some links may naturally operate at lower data rates (due to their frequency), have intermittent transmissions, and/or have narrower channel bandwidth, which can cause such links to perform sub-optimally when evaluated using prior art "siloed" approaches.

In contrast, the various embodiments of the present disclosure allow for such correlation and sharing of statistics across different links, including between higher-speed/higher bandwidth links and lower-speed/bandwidth ones, in effect accelerating the rate at which the receiver learns the statistics of each of the correlated links This translates to, inter alia, enhanced channel estimation accuracy. For example, classical MIMO channel estimation methods require knowledge of the second-order statistics of the vector channel between transmitter and receiver. In practice, these statistics are estimated from reference signals or training fields using a sample covariance matrix estimate. The accuracy of the estimate increases with the number of samples. Hence, two (or more) links of a MLD may have a common channel covariance matrix that can be better estimated jointly instead of individually, since joint estimation provides more estimation samples (and more samples per unit time).

Figure 5B:
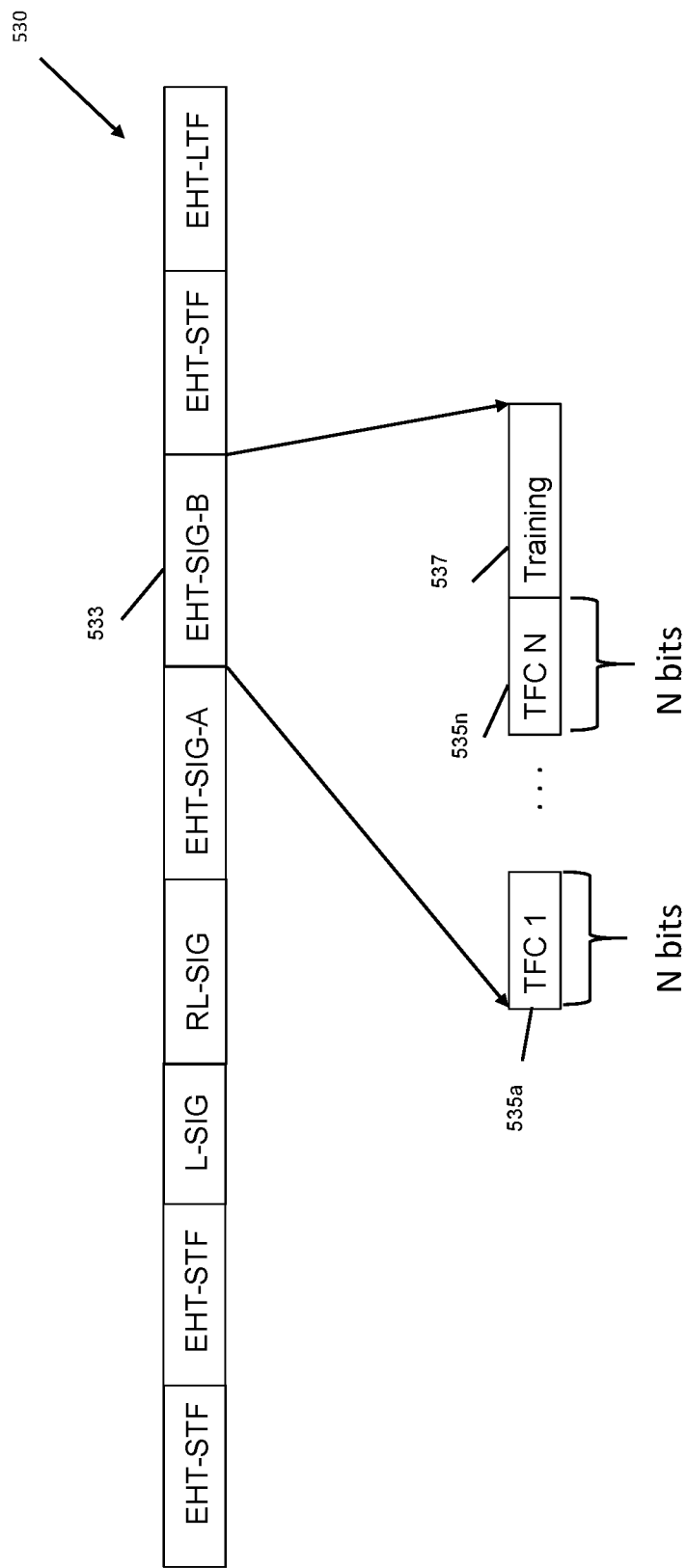
FIG. 5B is a graphical representation of an exemplary 802.11be MU frame structure according to one embodiment of the present disclosure.

FIG. 5B shows an exemplary configuration of an MU 802.11 frame (e.g., for use with 802.11be) according to the present disclosure. As shown, in this configuration, the EHT-SIG-B includes an N-bit (e.g., 5-bit) length TFCs 535a-535n for different users, and training field 537 used for channel estimation and synchronization. The TFC fields 535 indicate large-scale channel statistics (e.g., average delay, Doppler shift, statistical distribution, delay spread, etc.), which are used to improve channel estimation accuracy and decoding performance for each of the users individually.

As can be appreciated, the TFC fields for each different user may include the same or different TFC data than that of other users, depending on the particular aspects of each user and its relationship to the eAP(s). Note that the SIG-B field (e.g., HE-SIG-B, EHT-SIG-B) usually includes attributes such as user resources, Modulation and Coding Scheme (MCS) level, spatial layers, etc. As described herein, the TFC data may be valid for a portion of the bandwidth and/or for some of the recipients. The eAP 403 will determine the TFC for different users based on the quality of the estimated channel model or previously obtained channel state information for various users (eNAPs) that are being served in the MU frame. Hence, in some embodiments, the TFC for each user may be placed separately within the EHT-SIG-B field.

Figure 5C:
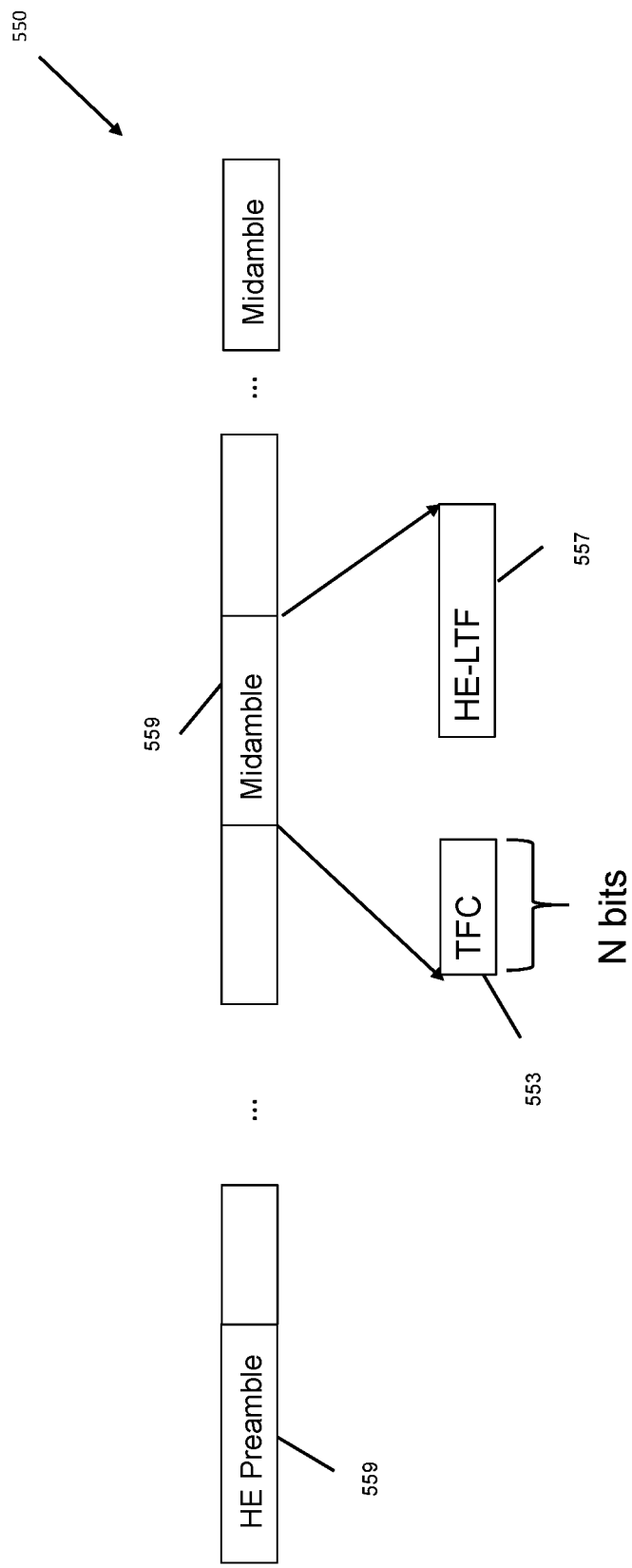
FIG. 5C is a graphical representation of another exemplary 802.11be frame structure according to one embodiment of the present disclosure.

FIG. 5C illustrates an embodiment of a modified 802.11 frame 559 including a modified midamble 559 according to the present disclosure. As shown, in this embodiment the midamble 559 includes the TFC field(s) 553. In some variants, to facilitate the utilization of TFC data of the midambles across multiple links, an initiating device such as the eAP 403 may use one or more of the same attributes for the midambles across such multiple links, e.g. the periodicity of midamble occurrences may be the same or approximately the same across the different links. Other parameters such as e.g., number of intervening frames may also be utilized for such purposes, such that the midamble occurrences can be selectively controlled and coordinated.

Figure 5D:
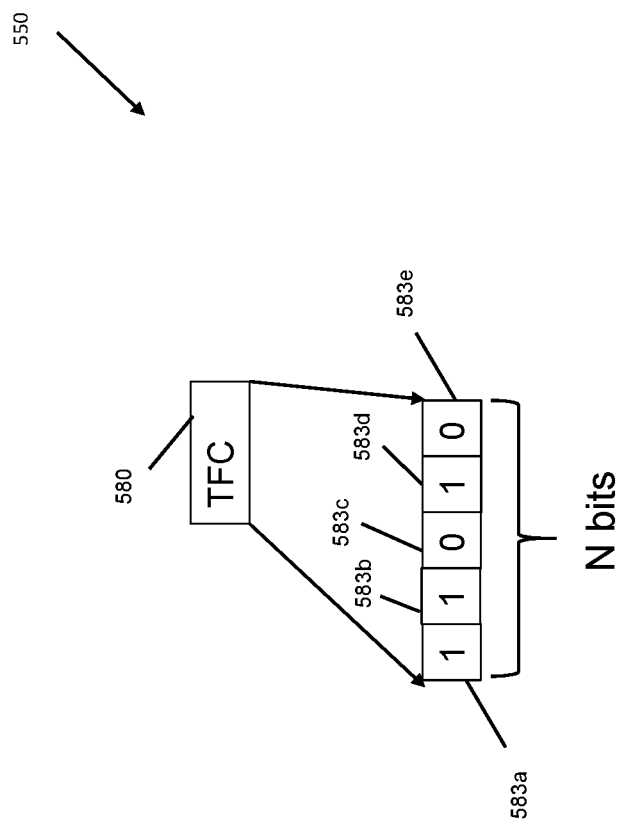
FIG. 5D illustrates one exemplary encoding scheme for TFC data according to the disclosure.

FIG. 5D illustrates one exemplary encoding scheme for the TFC data previously described. As shown, the TFC data 580 (which may be adapted for any of the applications shown in FIGS. 5A-5C) is comprised of a plurality of individual bits 583a-e arranged in a prescribed order, and each bit corresponding to a given e.g., large-scale channel statistic being correlated. For instance, bit 1 583a may correspond to average delay, bit 2 583b to Doppler shift, etc. The presence of a "1" in the field indicates that a suitable level of correlation exists, while a "0" indicates that no suitable correlation exists. Note that the level of "suitability" for assigning such bit values may (i) be varied dynamically, such as based on other inputs to or data available to the eAP(s), (ii) may vary from bit-to-bit (e.g., different thresholds may be used for suitability for each individual statistic), and (iii) may vary temporally. In use, the receiving MLD (e.g., the eNAP 405 of FIG. 4) can use this data to determine which statistics it can use in its channel estimation procedures.

It will be appreciated that while binary or two-state values (yes/no) are shown in FIG. 5D for the encoding scheme for simplicity, more granular and different types of encodings may be employed consistent with the disclosure. For example, in one variation, ten (10) bits (fields) are used to encode the TFC data, with two bits assigned to each of the five (5) parameters or statistics. As such, the two bits for each statistic can encode 2^2 or 4 states, such as "no" (00), "low" (01), "moderate" (10), and "high" (11) levels of correlation.

In yet other schemes, one or more "master" bits can be used (e.g., a sixth and seventh bit in the model of FIG. 5D, not shown), which can be read to determine zero or complete correlation for all other statistics. For instance, if the two master bits encode "00", no other fields need be read since no correlation exists. Likewise, if the master bits encode "11", then all statistics are correlated. Any other encodings require reading of all fields. This is particularly useful where a large number of statistics are utilized.

In yet another variant, the TFC data can be indicated on a pairwise basis for two or more of the links. For example, data encoding a "pairing" of links A and B, or A and C, or B and C, etc. can be utilized. This encoding may be used in place of or in addition to the foregoing approaches, such as where three (3) bits are used to encode links A, B, and C, respectively, and a "1" in any bit indicates it is correlated with any other link also encoding a "1".

Figure 6:
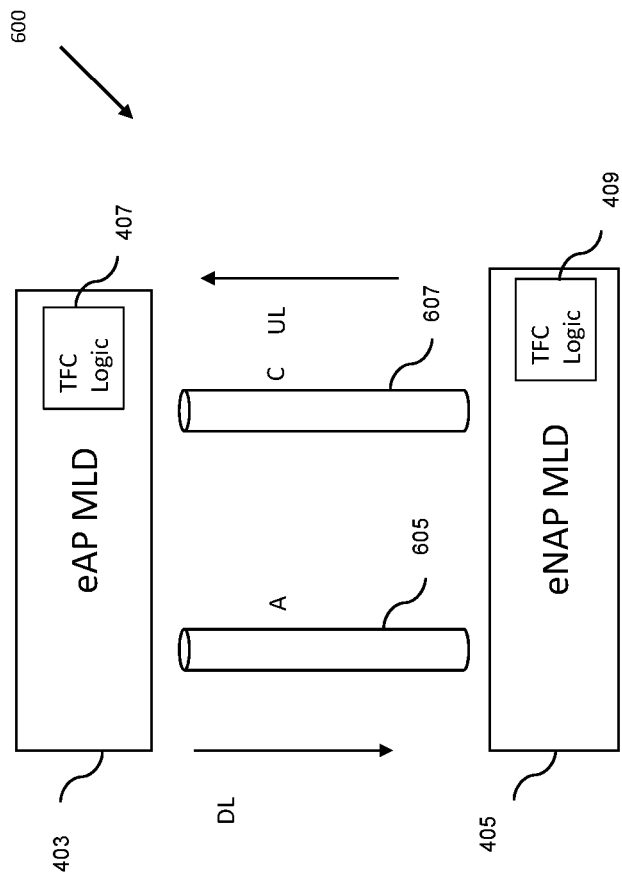
FIG. 6 is a functional block diagram illustrating an exemplary embodiment of an MLD configuration illustrating shared TFC data in UL/DL directions, according to the present disclosure.

FIG. 6 is a functional block diagram illustrating an exemplary embodiment of an MLD architecture illustrating shared TFC data in UL/DL directions, according to the present disclosure. As shown, the architecture 600 generally utilizes the eAP MLD 403, the eNAP device 405, an UL link 607 and a DL link 605 for transmission of data. In the exemplary embodiments, the links 605, 607 operate at different frequencies (e.g., 2.4 GHz, 5 GHz, or 6 GHz). The TFC logic 407 and 409 manages sharing of TFC data values on DL and UL links.

In this configuration, the training or correlation (e.g., TFC) data is defined across DL and UL directions, as well as across the different (frequency) links. While only two links are shown in FIG. 6 for simplicity, the DL/UL links may include multiple links carrying data on different frequencies (e.g. 2.4 GHz, 5 GHZ, 6 GHZ). Moreover, this concept may be extended to situations where (i) multiple eNAPs are in communication with a single eAP 403, and/or (ii) multiple eAPs are in communication with a common eNAP 405.

For instance, in some variants, the channel statistics defined in one direction (DL or UL) are used to compute the precoding/beamforming weights in the other direction (UL or DL, respectively). This may be for different links (as shown in FIG. 6, or even the same link.

In some other variants, the TFC indication from the eAP 403 to eNAP 405 or vice versa is determined from the most recent performed channel sounding, and may include consideration of some other attributes that can affect the TFC data, such as mobility. As specified in IEEE 802.11 specifications, the channel sounding is performed by sending Null Data Packets (NDP) packets, although other approaches may be used consistent with the broader principles of the present disclosure.

In one exemplary operational scenario, the eAP 403 indicates the DL-to-UL TFC data for links A and C 605, 607, on link A 605. The eNAP uses the received TFC data to compute MIMO precoding for link C 607 when transmitting data to the eAP 403. It will be appreciated, however, that the foregoing roles may be permuted or reversed, such as where the eNAP initiates the foregoing operation, or other types of MLDs are utilized (e.g., any two devices capable of MLD operation).

Figure 7:
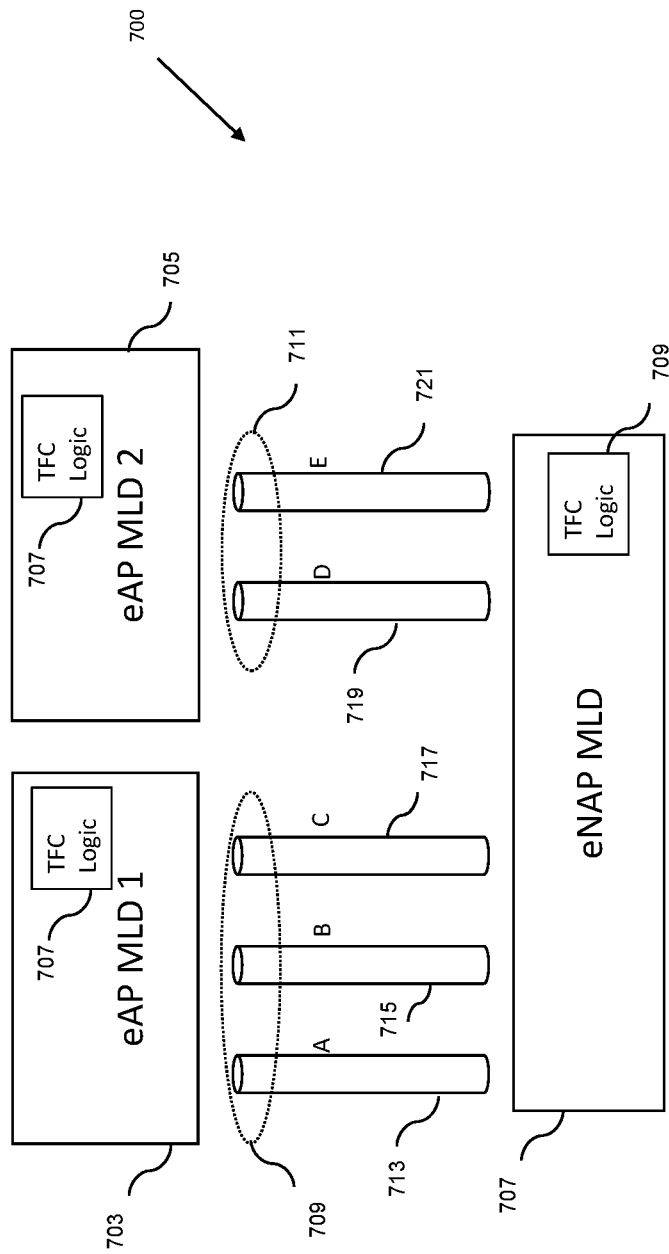
FIG. 7 is a functional block diagram illustrating an exemplary embodiment of an enhanced MLD architecture with multiple AP coordination functionality according to the present disclosure.

FIG. 7 is a functional block diagram illustrating an exemplary embodiment of an enhanced MLD architecture with multiple AP coordination functionality according to the present disclosure.

As shown this architecture 700 includes a first eAP 703, second eAP 705 and eNAP 707. The eAPs and eNAP communicate via multiple sets of e.g., wireless links 709, 711. Each of the eAP and eNAP include respective TFC logic 707, 709 as shown.

As a brief aside, as specified in 802.11be, multiple APs may coordinate their transmission with a given device (e.g., STA) based on coordinated beamforming or joint transmission, so as to enhance throughput. Hence, in one implementation, the architecture 700 of FIG. 7 can be applied in such cases, so as to further enhance inter alia, channel estimation by the eNAP 707.

In some implementations of the illustrated embodiment, the TFC data may be constructed to reflect a per-AP, per-link basis or granularity, and may "cross over." For instance, the TFC sent on any of the links of the first eAP 703 (i.e., links 713, 715, 717) between the eAP 703 and the eNAP 709 can address not only links 713, 715, 717, but also one or more of the links 719, 721 between the second eAP 705 and eNAP 707. Similarly, the TFC data sent on any of the links of the second eAP 719, 721 can address not only those links but also the links 713, 715, 717 between the first AP 703 and eNAP 707. As will be appreciated by those of ordinary skill given this disclosure, the foregoing logic can be extended to (i) different numbers of constituent links for each eAP (which may be symmetric or asymmetric), and (ii) more than the two eAPs shown in FIG. 7.

It is appreciated, that in the scenario shown in FIG. 7, both eAPs 703, 705 have data regarding the identity of the common eNAP 707 participating in multi-AP setup procedure. As such, the foregoing cross-eAP/cross-link TFC functionality is readily enabled, since the eAPs can in effect treat all of the links as a common "pool" of mutual links. From the eNAP's perspective, such coordination is also seamless; the eNAP can for instance perform enhanced channel estimation based on TFC data received over any of the links, regardless from which eAP it originates.

In some variants, where indication of proper TFC data among various links between the first eAP 703 and eNAP 707, and the second eAP 705 and eNAP 707, is not required, the two eAPs 703 and 705 may not need to share the statistics of the links with each other. Hence, the present disclosure further contemplates selective communication between the eAPs (such as via a backhaul Gbe or other connection and their individual IP addresses) that may be invoked only under certain conditions, such as where the eAPs are sufficiently spatially/geographically proximate to one another, both are non-mobile (and/or the eNAP is non-mobile, etc.).

Moreover, in some scenarios, such as based on eAP proximity to each other, the eNAP 707 may consider a certain/weak TFC (e.g., Doppler shift, delay spread, Doppler spread) among the sets of links 709, 711. For instance, the weak TFC may be due to the UE velocity vector being in largely the same direction (either toward or away), and having the same relative velocity, from the perspective of the proximate eAPs.

It will also be appreciated that "averaging" or other such aggregation of TFC data may be utilized in some embodiments.

eAP Apparatus—

Figure 8:
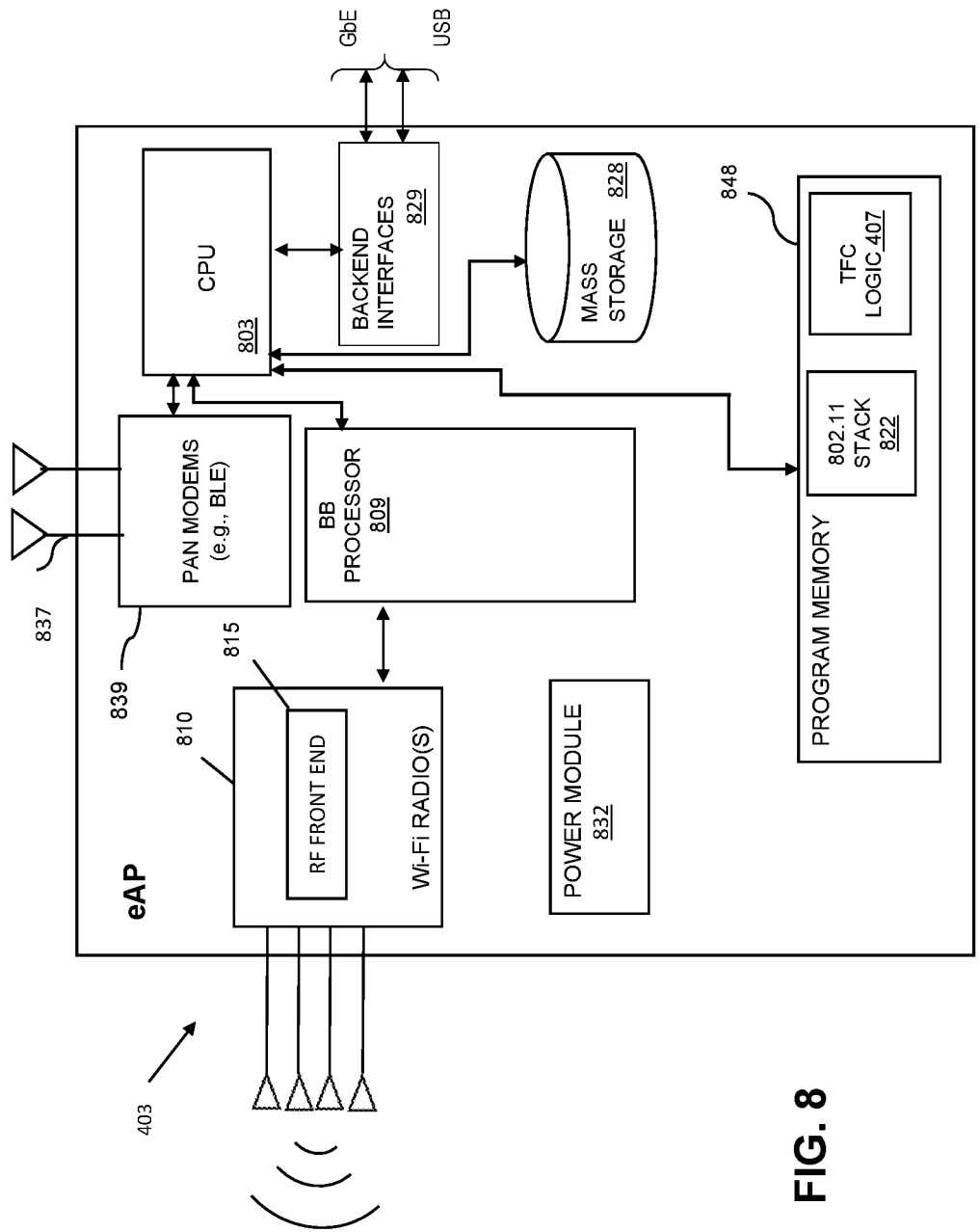
FIG. 8 is a functional block diagram of an exemplary embodiment of an enhanced AP apparatus (e.g., WLAN eAP) according to the present disclosure.

FIG. 8 is a functional block diagram of an exemplary embodiment of an enhanced AP (eAP) MLD according to the present disclosure.

As shown in FIG. 8, the eAP 403 (e.g., the WLAN access node shown in FIG. 4) includes, inter alia, a processor subsystem with CPU 803, a memory module 848, one or more network interfaces 815, one or more backend interfaces 829 (e.g., USB, GbE), a PAN module 839 with antenna 837, and a baseband processing module 809 and one or more Wi-Fi radios 810.

In one exemplary embodiment as shown, the processor subsystem 803 may include one or more of a digital signal processor (DSP), GPU, microprocessor (e.g., RISC core(s) such as ARM core), field-programmable gate array, or plurality of processing components mounted on one or more substrates (e.g., printed circuit board). The processor subsystem/CPU 803 may also comprise an internal cache memory (e.g., L1/L2/L3 cache). The processor subsystem is in communication with a memory subsystem 848, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem/CPU 803 is configured to execute at least one computer program stored in program memory 848 (e.g., a non-transitory computer readable storage medium). A plurality of computer programs (e.g., embodied as firmware) are used and are configured to perform various functions such as the various 802.11 and other protocols in support of eAP operation.

The TFC logic 407, which in this embodiment is stored in the program memory 407, constructs and supervises sharing of the TFC data in the links between the eAP and the eNAP device(s) as described and shown in the embodiments of FIGS. 4, 6, and 7. The TFC logic in some embodiments may further be configured to perform large-scale statistical analyses of the various links and their parameters in order to identify sufficiently correlated links. Higher layer logic such as that relating to multi-MLD relative position (i.e., the existence of a "common" propagation environment) or other factors may also be utilized consistent with the TFC logic 407 shown. Moreover, some calculations or analyses may be offloaded to other processes or even other entities, such as e.g., a cloud-based analytics process (e.g., on backed by machine learning or other computational capability beyond that of the eAP, or which has access to useful modeling or other data which the eAP does not).

The 802.11 stack 822 includes generating MAC and higher layer protocol messages that provide routing capability for the transmission and reception of data packets, including framing of the datagrams shown in FIGS. 5A-5D herein.

Various other functions useful for and typical in consumer electronics including baseband management (e.g., transmit and receive functions via the baseband processor 809 and associated Tx and Rx chains of the RF front end 815. For example, in one embodiment, the Tx and Rx chains are part of an RF front end used for OFDM-based RF communication with user client devices (e.g., WLAN STA's), including establishment of the multiple wireless links between the eAP and eNAP(s). It will be appreciated that while a single RF radio and front end are shown in the figure, multiple radios/transmit and receive chains may be used, such as where each individual chain is allocated to a band (e.g., 2.5, 5, or 6 GHz).

It will be appreciated that while shown as separate components, the eAP 403, router 121 and DOCSIS modem 119 (see FIGS. 1 and 14) can also be combined into a common device or form factor, thereby further simplifying the architecture. Likewise, the eAP can assume other form factors, such as an AP within a vehicular telematics system backhauled by a cellular modem, or an aircraft telematics system backhauled by e.g., an air-to-ground wireless or satellite system.

eNAP Apparatus—

Figure 9:
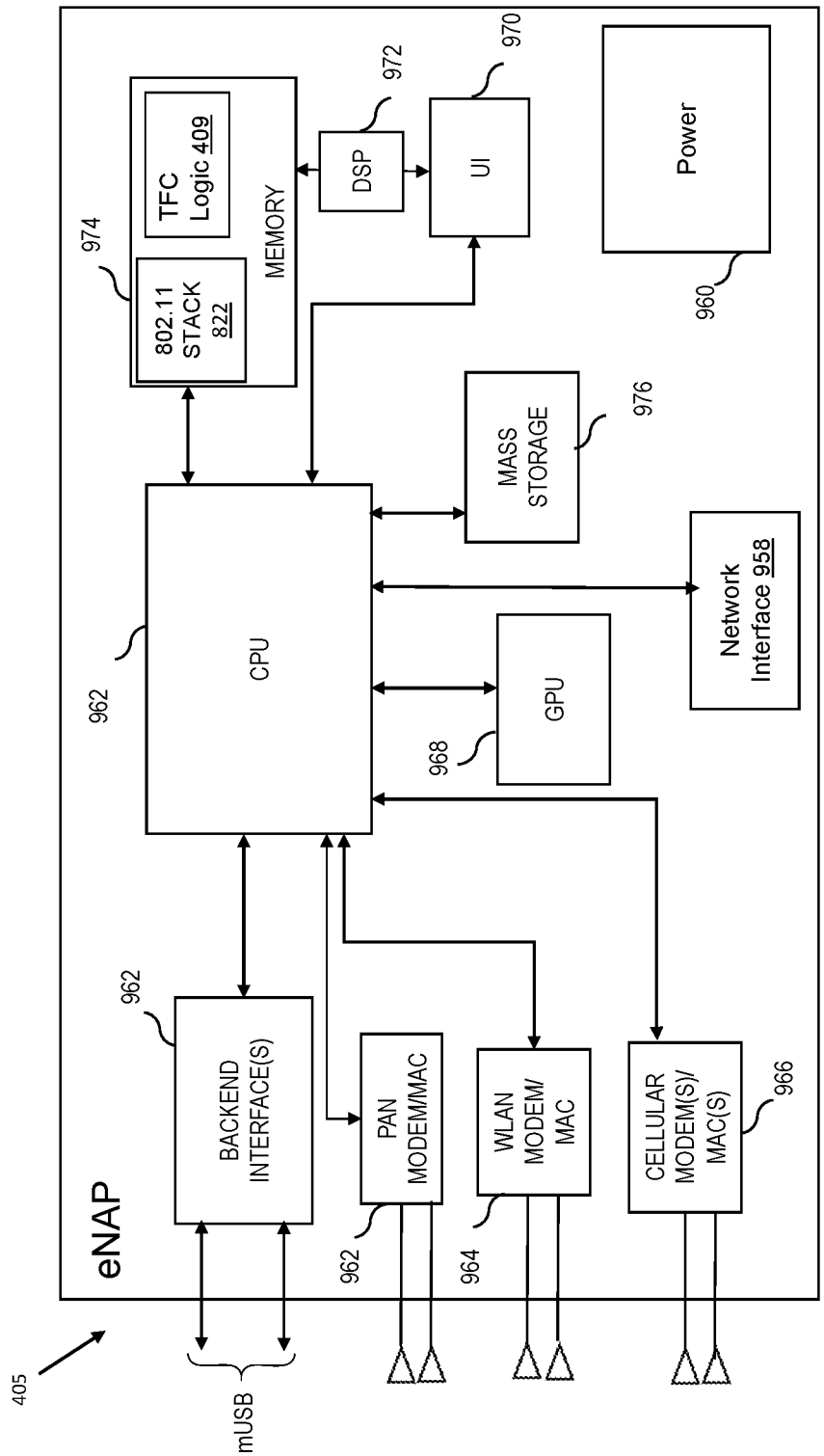
FIG. 9 is a functional block diagram of an exemplary embodiment of an enhanced NAP apparatus (e.g., WLAN eSTA) according to the present disclosure.

FIG. 9 is a functional block diagram of an exemplary embodiment of an enhanced Non-AP (eNAP) device apparatus according to the present disclosure. The eNAP 405 can assume various form factors and may be configured with other types of functionality, including as a 3GPP UE, WLAN-enabled tablet or laptop, smartphone, Smart TV, or as part of a vehicle or aircraft telematics system.

It will also be appreciated that the eNAP 405 (as well as the eAP 403 previously described) may each be configured to assume different roles (i.e., other than as eSTA and eAP, respectively). For instance, in some configurations, the eAP 403 and eNA 405 may "role reverse", wherein the eAP performs at least some eSTA functions, and the eNAP performs some eAP functions). As another example, one device may act as an "bridging" device to other WLAN-enabled devices (i.e., both an eSTA and an eAP).

As yet another option, the eNAP and/or eAP may participate within one or more mesh or "fog" networks.

Yet other configurations are possible as will be recognized b those of ordinary skill given the present disclosure.

As shown in FIG. 9, the eNAP (e.g., eSTA 405 of FIG. 4, 5, or 6) includes, inter alia, a processor subsystem with CPU 962, a memory module 974, one or more network interfaces 958, graphics co-processor (GPU) 968, mass storage device 976, DSP 972, and user interface (UI) 970. The device 900 also includes a PAN interface 962 (e.g., IoT, Bluetooth LE), WLAN (802.11) interface 964, and cellular data/voice interface(s) 966 (e.g., LTE for data with 3G/GSM for voice, or 5G NR).

In one exemplary embodiment, the processor subsystem/CPU 962 may include one or more of a digital signal processor (DSP), microprocessor (e.g., RISC core(s) such as ARM core), GPU, field-programmable gate array, or plurality of processing components mounted on one or more substrates (e.g., printed circuit board). The processor subsystem/CPU 962 may also comprise an internal cache memory (e.g., L1/L2/L3 cache). The processor subsystem is in communication with a memory subsystem 974, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem/CPU 962 is configured to execute at least one computer program stored in program memory 974 (e.g., a non-transitory computer readable storage medium). A GPU 968 and DRM module 974 are also in data communication with the processor subsystem, and collectively the foregoing components include a plurality of computer programs/firmware configured to perform various functions in coordination with processes such as the TCF logic 407. It will be appreciated that the illustrated TCF logic 407 may include the necessary logic and functionality to receive and process the TFCs on the wireless links between the eAP(s) 403 and the eNAP 405.

The TFC logic 407, which is stored in the program memory, manages receipt and utilization of the TFC data in the links between the eAP and the eNAP devices as described and shown in FIGS. 4, 6, and 7. This may include identification of correlated links and their associated TFC data for use in e.g., channel estimation procedures in support of MIMO operations, such as for subsequent communications between the eNAP and eAP 403.

The 802.11 stack 822 includes generating MAC and higher layer procedures and protocols that provides routing capability for the transmission and reception of data packets, including in accordance with 802.11be protocols in some embodiments.

Various other functions useful for and typical in consumer electronics including user interface via the UI 970 (e.g., capacitive touch-screen with soft function key generation) and speech recognition via the DSP 972 are provided in the exemplary mobile device 900.

Methods—

Referring now to FIGS. 10-13, exemplary embodiments of various methods of configuration and operation according to the present disclosure are shown and described in detail. It will be appreciated that while shown generally in the context of IEEE Std. 802.11 WLAN systems (such as the exemplary eAP and eNAP apparatus previously described herein) and particularly incipient IEEE Std. 802.11be, the methods may be readily adapted by those of ordinary skill to other technologies and applications, including e.g., other multi-link capable devices and protocols.

Figure 10:
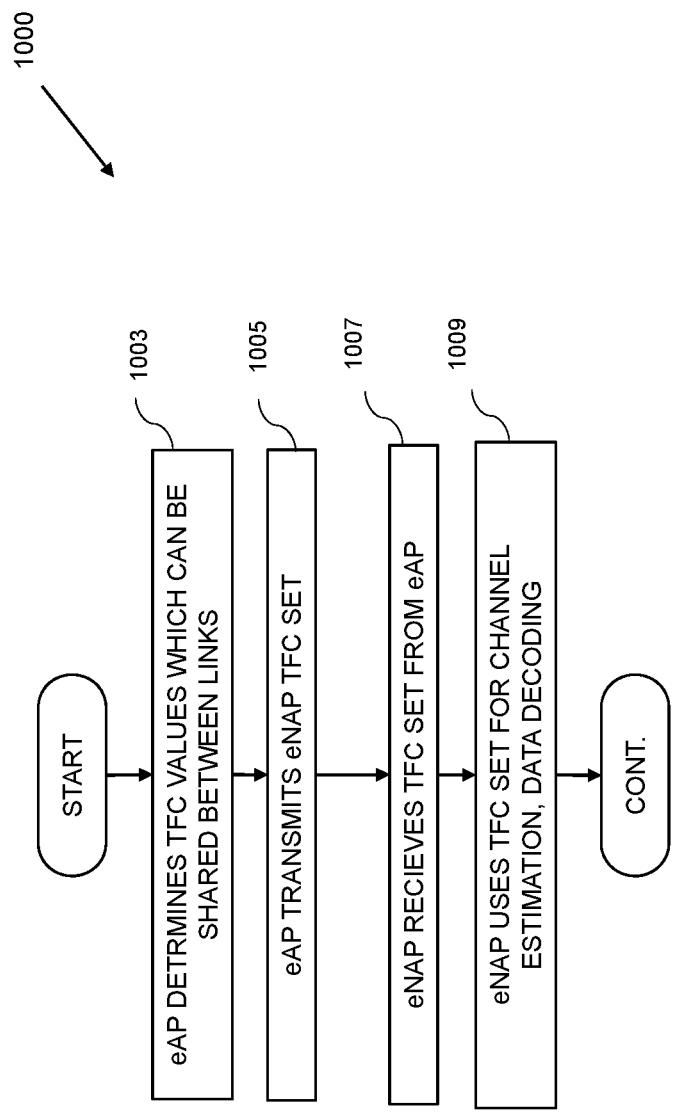
FIG. 10 is a logical flow diagram representing one embodiment of a method for operating an eMLD with shared TFC functionality, in SU mode according to the present disclosure.

FIG. 10 is a logical flow diagram representing one embodiment of a method for operating an eMLD with shared TFC functionality, in SU mode according to the present disclosure.

Per step 1003 of the method 1000, the eAP first determines training or correlation data (e.g., TFC values) which can be shared or correlated between two or more of the links between the eAP and eNAP, as previously described. The TFC values may in some embodiments encode large-scale channel properties such as Doppler shift, Doppler spread, average delay, delay spread, such as using the encoding of FIG. 5D.

Per step 1005, the eAP transmits the relevant data (e.g. TFC) sets, which are sent on one or more of the eAP/eNAP links, and which are in effect shared between two or more of the multiple links. In some scenarios, the TFC set may be sent on one link, and shared between multiple links. In some other scenarios, multiple TFC data sets may be sent via multiple links. As previously noted, when multiple TFC sets are utilized, they may be symmetric or asymmetric (different) in their content or other transmission characteristics, depending on the configuration chosen by the TFC logic 407 of the transmitting MLD, such as based on the frequency band utilized by each link.

Per step 1007, the STA receives the TFC data set(s) from the eAP. As described previously, in the exemplary embodiments, the TFC data is sent via the SIG-A field in SU scenarios. In some embodiments, the TFC set may be sent via midamble as well (see FIG. 5C).

At step 1009, the eNAP uses the received TFC set in channel estimation, and data decoding. In some embodiments, the TFC data may include second-order statistics of the channel, which are used in some channel estimation mechanisms. As described previously in detail, MIMO channel estimation methods generally require knowledge of the second-order statistics of the channel matrix between transmitter and receiver. In practice, these statistics are estimated from sounding reference signals. Hence, when two or more link shares the same TFC values, the joint channel estimation algorithm among the links may be used. Such joint channel estimation mechanism accuracy is significantly higher than the individual channel estimation accuracy due to the availability of a larger number of samples from which to obtain the estimates.

Figure 11:
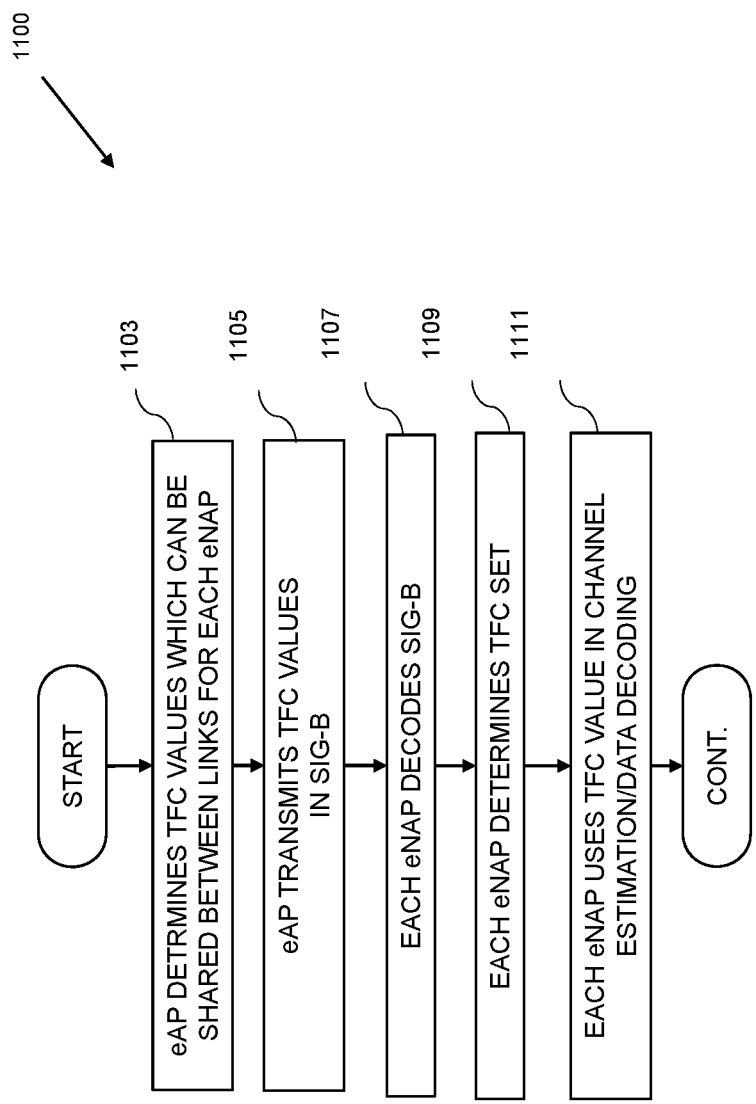
FIG. 11 is a logical flow diagram representing one embodiment of a method for operating an eMLD with shared TFC functionality, in MU mode according to the present disclosure.

FIG. 11 is a logical flow diagram representing one embodiment of a method for operating an eMLD with shared TFC functionality, in MU mode according to the present disclosure.

Per step 1103, the eAP 403 determines the TFC data values which can be shared between the links for each user device (e.g., eNAP 405). As previously noted, in an EHT MU frame, the TFC data may be valid for (i) only a portion of the bandwidth utilized, and (ii) only for some of the users communicating with the eAP. As such, a multi-dimensional matrix or other data structure can be formed correlating which parameters are relevant for which eNAPs and within which bands. This may be formed based on channel path loss and other models known to the eAP or a network proxy thereof (e.g., a cloud modeling process).

Per step 1105, the eAP transmits the TFC data sets to the various eSTA via e.g., the SIG-B field (see FIG. 5B). In some scenarios, based on e.g., the channel estimation quality and modeling, the eAP may determine that the TFC data for some of the users are different than the other users. Hence in these cases, the AP may indicate an individual (different) TFC data set for each user, such as by using different TFC sub-fields within the SIG-B field.

Moreover, in some embodiments, the TFC data may be indicated (including repeated) in one or more midambles of the frame as specified in FIG. 5C.

Per step 1107, each user device (eNAP) decodes the SIG-B field, and extracts its associated TFC set per step 1109. For instance, in one variant, the individual TFC data sets are identified as being applicable eSTA by an included or embedded eSTA-specific identifier which is unique to a given eSTA.

Per step 1111, each user device uses the TFC set applicable to them to enhance data decoding performance. For instance, in one embodiment, the TFC sets may include second-order statistics of the wireless channels between the eSTAs and the eAP for each user; thereby, the channel estimation mechanism may utilize the TFC set to improve the channel estimation quality.

Figure 12:
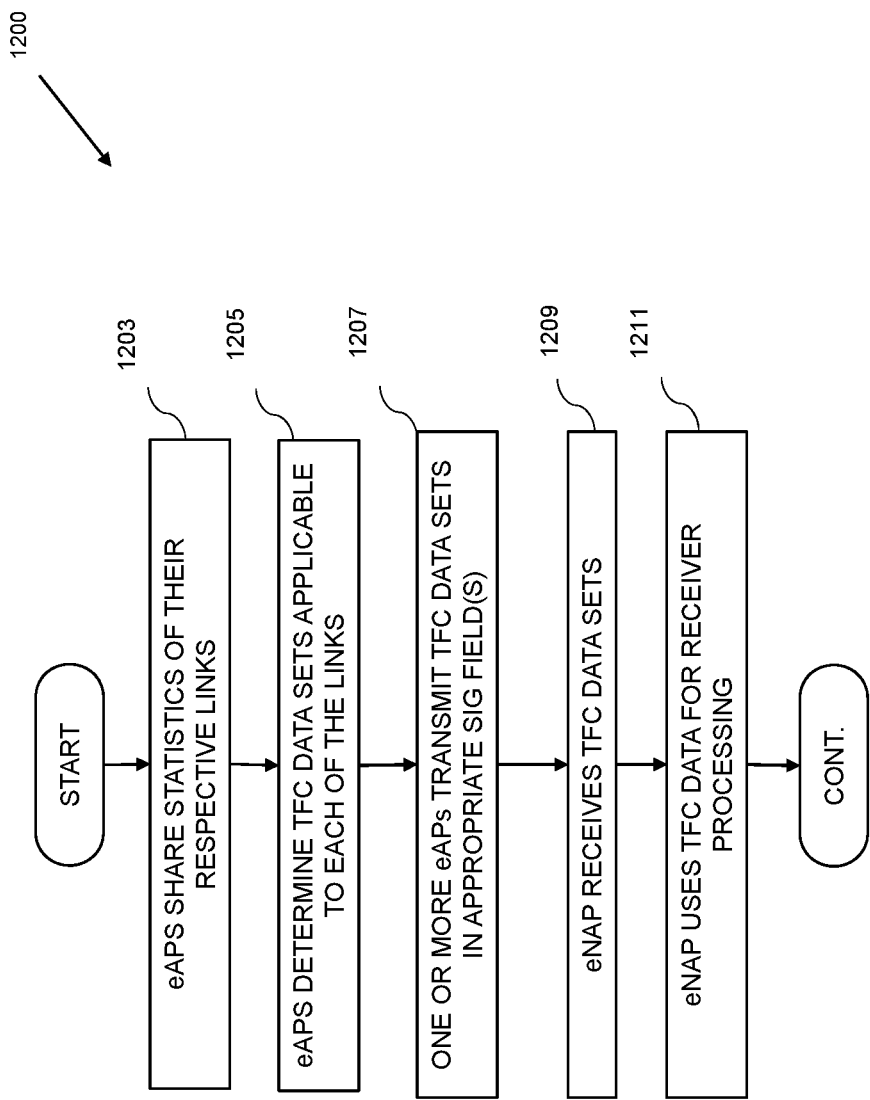
FIG. 12 is a logical flow diagram representing one embodiment of a method for operating an eMLD with multi-AP coordination and shared TFC functionality, according to the present disclosure.

FIG. 12 is a logical flow diagram representing one embodiment of a method for operating an eMLD with multi-AP coordination and shared TFC functionality, according to the present disclosure.

Per step 1203, two or more eAPs 403 communicate with each other to share statistical data (which may be raw data, or processed data, including e.g., the TFC data sets) applicable to the links between each eAP and its associated eNAP (e.g., eSTA). This sharing of data may be (i) one-way, such as where one eAP shares its data with another eAP, but the another eAP does not share its data back to the first (sharing) eAP; (ii) two-way, such as where two eAPs share their data with each other; (iii) multi-way sharings, such as where each eAP within a group of three or more "common" eAPs shares its data with multiple others of the eAPs; or (iv) combinations of the foregoing. As previously noted, depending on topology, location, and/or other considerations, eAPs may selectively share or not share their data.

Moreover, "master/minion" or other such models where the eAPs assume asymmetric roles for purposes of sharing channel statistical data may be employed. For example, in one such model, a given eAP may assume the "master" role, wherein it aggregates data from one or more other "minion" eAPs which are also communicative with a common eNAP (e.g., eSTA), and analyzes, generates and transmits the requisite TFC data sets via one or more of its links, the transmitted data indicating to the eSTA the correlations for the links of the "minion" eAPs as well (thereby alleviating the minion eAPs from transmitting such data). Similarly, one eAP can be assigned a role of "master calculation eAP", such that one eAP calculates the TFC data sets for all eAPs.

Returning to FIG. 12, per step 1205, one or more of the eAPs determine the TFC data sets, which indicate correlation between the links. The eAPs may also in some variants monitor the channel quality of different ones of the links, and selectively determine the links that are used to carry the TFC data sets.

Per step 1207, one or more eAPs transmit TFC data sets using one or more of the SIG-A or SIG-B fields (depending on configuration). For instance, in SU scenarios, the TFC data may be indicated in the SIG-A field, and in MU scenarios the TFC data may be indicated in SIG-B field. Note that it is possible to have both (i) multiple eAPs transmitting to a common eNAP 405, and (ii) multiple eNAPs communicative with one or more of the multiple eAPs.

Per step 1209 of the method 1200, the eSTA decodes the relevant SIG field(s), and extracts its TFC data values.

Lastly, per step 1211, the eSTA uses the extracted TFC set for data decoding and channel estimation purposes as described previously.

Figure 13:
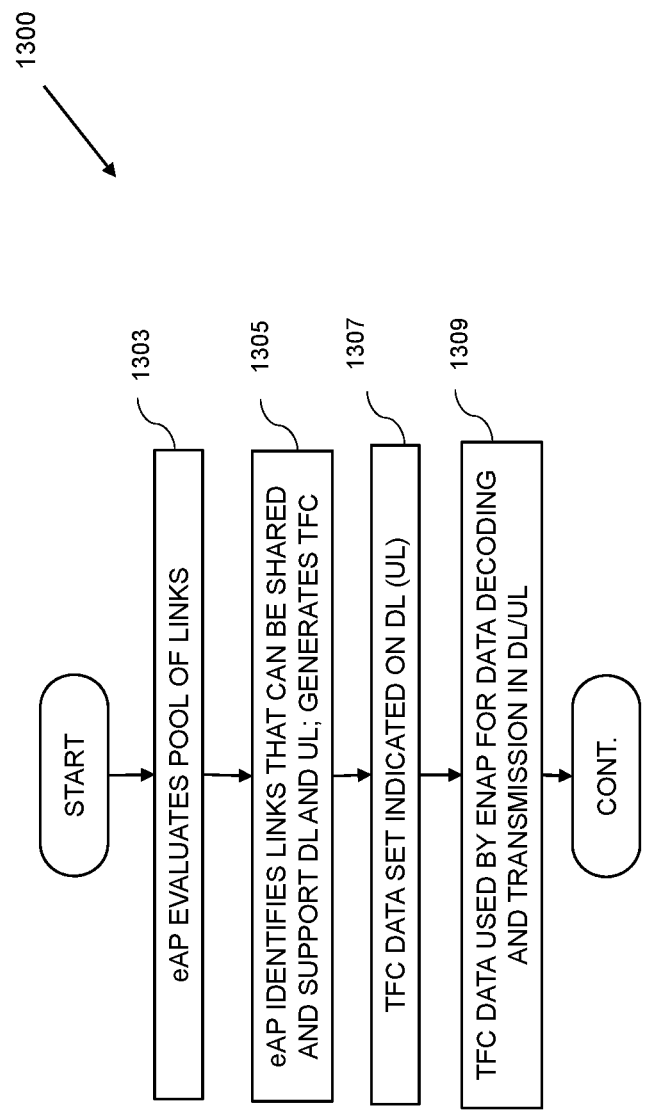
FIG. 13 is a logical flow diagram representing one embodiment of a method for operating an eMLD with shared TFC functionality in DL and UL directions, according to the present disclosure.

FIG. 13 is a logical flow diagram representing one embodiment of a method for operating an eMLD (such as e.g., the eAP or eNAP of FIG. 4) with shared TFC data functionality in DL and UL directions, according to the present disclosure. In effect, the TFC data set transmitted as part of this method allows the receiving eNAP (and the eAP) to utilize channel statistics relating to one direction to compute MIMO precoding/beamforming information relating the other direction. In other words, beamforming based on DL-to-UL reciprocity across links is advantageously enabled.

As previously discussed, the DL and UL directions that are correlated or "shared" via the foregoing reciprocal relationship may include for example DL and UL on different links of the same eAP/eNAP MLD pair (as in FIG. 6).

Per step 1303 of the method 1300, the eAP evaluates the pool of available links that can potentially be used as DL and UL links. For instance, the channel statistics in one DL(UL) link can be used to compute beamforming/precoding weights on the UL(DL) based on the channel reciprocity between the UL/DL links where the two links share sufficient commonality.

Per step 1305, the eAP identifies the eligible links that can participate and generates the TFC data set for transmission to the eNAP (step 1307) such as on link 'A' of FIG. 6. The TFC data set is transmitted to the eNAP, and when received, the eNAP decodes and determines that it can use the designated second link (e.g., link "C") for uplink transmission, including using the channel statistics of the DL (link A) for the uplink on link A, thereby enhancing the channel estimation for that second link performed by the eNAP 405 (step 1309).

Service Provide Network—

Figure 14:
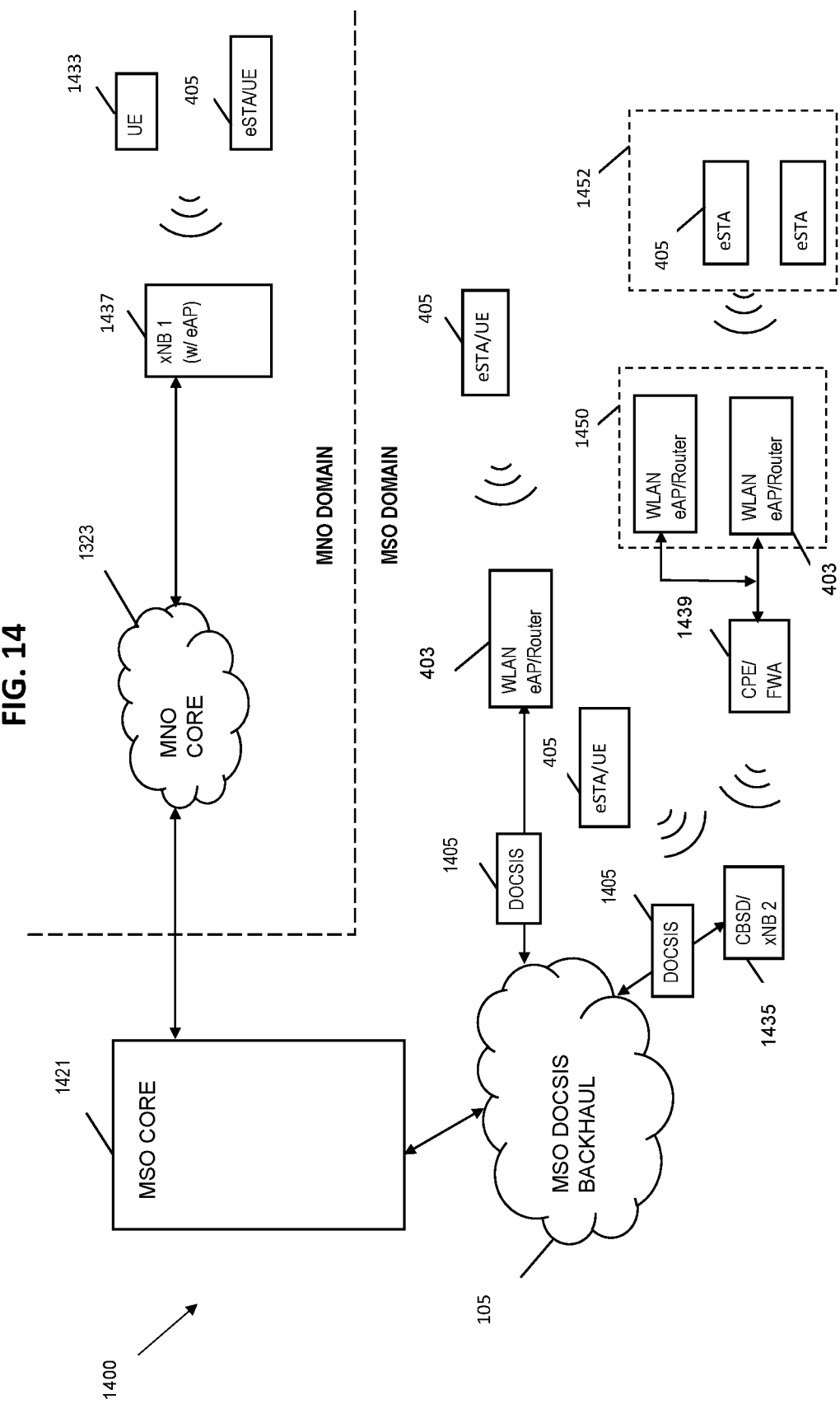
FIG. 14 is a functional block diagram illustrating of an exemplary network architecture useful in conjunction with various principles described herein.

FIG. 14 illustrates one embodiment of a service provider network architecture useful with the channel data sharing—equipped multi-link devices according to the present disclosure. It will be appreciated that while described with respect to such network configuration, the methods and apparatus described herein may readily be used with other network types and topologies, whether wired or wireless, managed or unmanaged, including e.g. ad hoc WLANs.

The exemplary service provider network 1400 is used to provide backbone and Internet access from the service provider's wireless access nodes (e.g., CBSD/xNBs, Wi-Fi eAPs, FWA devices or base stations operated or maintained by an MSO), and one or more stand-alone or embedded DOCSIS cable modems (CMs) 1405 in data communication therewith. For instance, IP-based traffic may be transacted between the premises devices described below and MSO or third-party servers via the aforementioned backhaul and delivery infrastructure.

As shown, the individual CBSD/xNBs (e.g., 3GPP eNBs or gNBs operating using CBRS or C-Band or mmWave frequencies) 1435 are backhauled by the CMs 1405 to the MSO core via 1421. Each of the CPE/FWA 1439 and UE 1433 are communicative with their respective CBSD/xNBs 1405. The eAP MLDs (e.g., WLAN routers) 403 are connected to the CM 1405 directly via a wired link such as a Gigabit Ethernet or other link (e.g., where the CM is disposed at a user's premises), or indirectly linked to the CM 1305 via the CPE/FWA 1439 and CBSD/xNB 1435, such as where the user's premises is backhauled wirelessly by the CBSD/xNB, the latter which is backhauled by the CM.

Client devices (eSTA) 405, which may also integrate UE functionality, may include for example tablets, smartphones, SmartTVs, etc. are disposed at each premises or "roaming" off premises, and are served by respective WLAN eAP/routers 403.

As shown, the eAP functionality described herein may also be integrated into xNBs operated by e.g., an MNO, so as to provide e.g., eSTA 405 connectivity back to the MSO core 1421 (such as for service provision to MSO subscribers while they are roaming away from any MSO coverage areas.

Further, as illustrated in FIG. 14, aggregates 1450, 1452 of eAPs 403 and/or eSTA 405, respectively may exist, such as where a given premises has multiple eAPs which can be coordinated as previously described herein, and/or multiple eSTAs which can be individually served by the one or more eAPs as previously described herein.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method of operating a multi-link access point within a wireless network, the method comprising:
    simultaneously transacting data frames between the multi-link access point and at least one user device via a plurality of wireless links, each of the plurality of wireless links assigned to a different frequency band;
    measuring at least one parameter relating to channel quality in each of the plurality of wireless links;
    determining at least one channel quality statistic based at least on the measuring; and
    utilizing the determined at least one channel quality statistic across two or more of the plurality of wireless links so as to improve at least one aspect of wireless link performance.

2. The method of claim 1, wherein the at least one user device comprises a plurality of user devices, and the utilizing the determined at least one channel quality statistic across two or more of the plurality of wireless links comprises utilizing the determined at least one channel quality statistic only across selected ones of the plurality of user devices.

3. The method of claim 1, wherein the at least one user device comprises a plurality of user devices, and the utilizing the determined at least one channel quality statistic across two or more of the plurality of wireless links comprises utilizing the determined at least one channel quality statistic only across selected ones of the plurality of wireless links.

4. The method of claim 1, wherein the measuring of the at least one parameter relating to the channel quality in each of the plurality of wireless links comprises measuring at least one parameter selected from a group consisting of: (i) average delay, (ii) Doppler Shift, (iii) delay spread, (iv) Doppler spread, and (iv) beam direction.

5. The method of claim 1, wherein:
    the determining of the at least one channel quality statistic comprises determining at least one large-scale channel statistic; and
    the utilizing the determined at least one channel quality statistic across the two or more of the plurality of wireless links so as to improve the at least one aspect of the wireless link performance comprises using the at least one large-scale channel statistic across at least three (3) different wireless links of a same receiver so as to improve at least MIMO (multiple input multiple output) channel estimation for at least one of the three different wireless links.

6. A computerized wireless device configured for wireless communication with a wireless network access point within a wireless infrastructure, the computerized wireless device comprising:
    digital processing apparatus;
    at least one wireless network interface in data communication with the digital processing apparatus, the at least one wireless network interface is compliant with an Institute of Electrical and Electronics Engineers (IEEE) 802.11be standard supporting multiple wireless links; and
    a storage device in data communication with the digital processing apparatus, the storage device comprising a storage medium having at least one computer program, the at least one computer program configured to, when executed on the digital processing apparatus, cause the computerized wireless device to:
        establish a plurality of wireless links with the wireless network access point, the plurality of wireless links each utilizing a frequency band different than one or more others of the plurality of wireless links, wherein the establishment of the plurality of wireless links with the wireless network access point comprises establishment of at least one link within at least each of: (i) a 2.4 GHz frequency band; and (ii) at least one of a 5 GHz frequency band or a 6 GHz frequency band;
        receive a plurality of training data via at least a portion of the plurality of wireless links, the plurality of training data comprising data based on large-scale channel statistical data, the reception of the plurality of training data via at least the portion of the plurality of wireless links comprises reception of link correlation data via at least one preamble or midamble of a single user (SU) frame, the link correlation data valid across each of (i) the 2.4 GHz frequency band; and (ii) the at least one of the 5 GHz frequency band or the 6 GHz frequency band; and
        utilize the received plurality of training data as part of at least one of a channel estimation process performed by the computerized wireless device.

7. A method of operating a multi-link access point within an IEEE Std. 802.11-compliant wireless network, the method comprising:
    simultaneously transacting data frames between the multi-link access point and at least one user device via a plurality of wireless links, a first of the plurality of wireless links assigned to a 2.4 GHz frequency band, and a second of the plurality of wireless links assigned to either a 5 GHz frequency band or a 6 GHz frequency band;
    measuring at least one parameter relating to channel quality in at least each of the first and second of the plurality of wireless links;
    determining at least one channel quality statistic based at least on the measuring; and
    utilizing the determined at least one channel quality statistic across at least the first and second of the plurality of wireless links so as to improve at least one aspect of wireless link performance.

8. The method of claim 7, wherein the IEEE Std. 802.11-compliant wireless network comprises an IEEE Std. 802.11be-compliant network.

9. The method of claim 7, wherein:
    the at least one user device comprises a plurality of user devices; and
    the utilizing the determined at least one channel quality statistic comprises utilizing the determined at least one channel quality statistic only across selected ones of the plurality of user devices.

10. The method of claim 7, wherein the utilizing the determined at least one channel quality statistic comprises utilizing the determined at least one channel quality statistic only across the first and second of the plurality of wireless links.

11. The method of claim 7, wherein the measuring of the at least one parameter relating to the channel quality in each of the first and second of the plurality of wireless links comprises measuring at least one parameter selected from a group consisting of: (i) average delay, (ii) Doppler Shift, (iii) delay spread, (iv) Doppler spread, and (iv) beam direction.

12. The method of claim 7, wherein:
the determining of the at least one channel quality statistic comprises determining at least one large-scale channel statistic; and
the utilizing the determined at least one channel quality statistic across the at least the first and second of the plurality of wireless links so as to improve the at least one aspect of the wireless link performance comprises using the at least one large-scale channel statistic across at least three (3) different wireless links of a same receiver so as to improve at least MIMO (multiple input multiple output) channel estimation for at least one of the three different wireless links.

13. The method of claim 7, further comprising
receiving a plurality of training data via at least a portion of the plurality of wireless links, the receiving of the plurality of training data comprising receiving link correlation data via at least one preamble or midamble of a multiple user (MU) frame, the link correlation data valid only across a subset of frequency bands utilized by the first and second of the plurality of wireless links.

14. The method of claim 7, further comprising
receiving a plurality of training data via at least a portion of the plurality of wireless links, the receiving of the plurality of training data comprising receiving link correlation data via at least one preamble or midamble of a single user (SU) frame, the link correlation data valid only across a subset of frequency bands utilized by the first and second of the plurality of wireless links.

15. The method of claim 7, wherein the utilizing the determined at least one channel quality statistic across at least the first and second of the plurality of wireless links comprises utilizing the determined at least one channel quality statistic across at least the first of the plurality of wireless links for the second of the plurality of wireless links so as to exploit at least one commonality between at least the first and second of the plurality of wireless links.

16. The method of claim 15, wherein the utilizing the determined at least one channel quality statistic across at least the first of the plurality of wireless links for the second of the plurality of wireless links so as to exploit the at least one commonality between at least the first and second of the plurality of wireless links comprises utilizing the at least one channel quality statistic to increase a quality of MIMO (multiple input, multiple output) channel estimation for at least the first and second of the plurality of wireless links.

17. The method of claim 15, wherein the utilizing the determined at least one channel quality statistic across at least the first of the plurality of wireless links for the second of the plurality of wireless links so as to exploit the at least one commonality between at least the first and second of the plurality of wireless links comprises utilizing training correlation data based at least in part on data relating to the at least one channel quality statistic.

18. The method of claim 17, wherein the utilization of the training correlation data based at least in part on the data relating to the at least one channel quality statistic comprises transmission from the multi-link access point of the training correlation data to one or more receiver devices in wireless communication with the multi-link access point, the transmitted training correlation data indicating a correlation between at least the first and second of the plurality of wireless links.

19. The method of claim 18, wherein:
the one or more receiver devices each comprise an STA (station) compliant with at least one IEEE Std. 802.11 standard; and
the transmitted training correlation data comprises data indicative of a plurality of parameters each relating to one or more physical characteristics of the first of the plurality of wireless links.

* * * * *